United States Patent
Li et al.

(10) Patent No.: US 11,151,451 B2
(45) Date of Patent: Oct. 19, 2021

(54) DATA PROCESSING METHOD AND APPARATUS FOR TRAINING INCREMENTAL MODEL OF NEURAL NETWORK

(71) Applicant: TENCENT TECHNOLOGY (SHENZHEN) COMPANY LIMITED, Guangdong (CN)

(72) Inventors: Yi Li, Shenzhen (CN); Xing Jin, Shenzhen (CN); Shubin Zhang, Shenzhen (CN); Zhimao Guo, Shenzhen (CN); Wei Xue, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 778 days.

(21) Appl. No.: 16/026,784

(22) Filed: Jul. 3, 2018

(65) Prior Publication Data
US 2018/0314944 A1 Nov. 1, 2018

Related U.S. Application Data

(63) Continuation of application No. PCT/CN2017/105813, filed on Oct. 12, 2017.

(30) Foreign Application Priority Data

Oct. 14, 2016 (CN) .......................... 201610900390.7

(51) Int. Cl.
*G06N 3/08* (2006.01)
*G06F 17/16* (2006.01)
(Continued)

(52) U.S. Cl.
CPC ............... *G06N 3/08* (2013.01); *G06F 17/16* (2013.01); *G06N 3/049* (2013.01); *G06N 3/0472* (2013.01);
(Continued)

(58) Field of Classification Search
CPC ...... G06F 17/16; G06N 3/0472; G06N 3/049; G06N 3/08; G06Q 30/0241; G06Q 30/0242
See application file for complete search history.

(56) References Cited

U.S. PATENT DOCUMENTS 8,595,154 B2 * 11/2013 Breckenridge ........ G06N 20/00
706/12
2006/0224532 A1 10/2006 Duan et al.

FOREIGN PATENT DOCUMENTS

| CN | 103489034 A | 1/2014 |
|---|---|---|
| CN | 104598552 A | 5/2015 |

(Continued)

OTHER PUBLICATIONS

Scholz et al., "Boosting Classifiers for Drifting Concepts", 2006, Universität Dortmund, Sonderforschungsbereich 475, pp. 1-40. (Year: 2006).*

(Continued)

*Primary Examiner* — Kamran Afshar
*Assistant Examiner* — Brent Johnston Hoover
(74) *Attorney, Agent, or Firm* — Sughrue Mion, PLLC

(57) ABSTRACT

A data processing method in a data processing device is provided. First to-be-processed data input into a neural network are obtained. Iterative training is performed on the neural network for a first preset number of times by using first target data in the first to-be-processed data, to obtain a seed model of the neural network. First newly added data generated after an elapse of time corresponding to the first (Continued)

time window is obtained, and the first newly added data and the first to-be-processed data are combined into second to-be-processed data. Iterative training is performed on the seed model for a second preset number of times by using second target data in the second to-be-processed data, to obtain a first incremental model of the neural network. A first preset area overlaps between the second time window and the first time window. The first incremental model online is published.

17 Claims, 12 Drawing Sheets

(51) Int. Cl.
    *G06N 3/04*     (2006.01)
    *G06Q 30/02*     (2012.01)
(52) U.S. Cl.
    CPC ..... *G06Q 30/0241* (2013.01); *G06Q 30/0242* (2013.01)

(56) References Cited

FOREIGN PATENT DOCUMENTS

| CN | 105095964 A | 11/2015 |
|---|---|---|
| CN | 105279556 A | 1/2016 |

OTHER PUBLICATIONS

International Search Report for PCT/CN2017/105813 dated, Jan. 15, 2018 (PCT/ISA/210).

Written Opinion dated Jan. 15, 2018 by the International Searching Authority in application No. PCT/CN2017/105813.

Communication dated Oct. 21, 2019 by the State Intellectual Property Office of P.R. of China in application No. 201610900390.7.

Communication dated Mar. 23, 2020, from the State Intellectual Property Office of the P.R.C in application No. 201610900390.7.

\* cited by examiner

○ ——— Input layer nerve cells and connection relationships that are represented by failure keys

DATA PROCESSING METHOD AND APPARATUS FOR TRAINING INCREMENTAL MODEL OF NEURAL NETWORK

CROSS-REFERENCE TO RELATED APPLICATIONS

This application is a continuation of International Application No. PCT/CN2017/105813, filed on Oct. 12, 2017, in the Chinese Patent Office, which claims priority from Chinese Patent Application No. 201610900390.7, entitled "DATA PROCESSING METHOD AND APPARATUS", filed on Oct. 14, 2016, in the Chinese Patent Office, the disclosures of which are incorporated by reference in their entireties.

BACKGROUND

1. Field

Apparatuses and methods consistent with exemplary embodiments relate the field of data processing, and specifically, to a data processing method and apparatus.

2. Description of the Related Art

With the development of data processing technologies, in data processing, a logistic regression (or referred to as "LR") model has been widely applied to pre-estimating an advertisement click-through rate. However, because the logistic regression model is a linear model, consequently, the limitation thereof is the difficulty in learning nonlinear information in original features and a feature combination.

A click-through rate pre-estimation method by constructing a deep neutral network exists in conventional manners. For example, nonlinear information can be learned from original features during advertisement click-through rate pre-estimation by constructing a deep neural network. On one hand, because in a conventional machine learning frame, the task of deep neural network learning is to learn a click-through rate pre-estimation model based on that sufficient training data is provided, and then predict online, in real time by using the learned model, a click behavior of a user on an advertisement. On the other hand, a data environmental itself for online release of the Internet quickly changes. For example, user groups quickly change, that is, new users constantly join and users constantly generate new behaviors and new points of interest. For another example, new data constantly appears and old data is constantly discontinued. Therefore, a data processing model needs to be quickly updated, to adapt to quick changes of the data environment. To reflect a data environment that quickly changes, quick model update needs to be implemented, so that model training needs to be completed within limited time.

In data processing, model training needs to take a large amount of time. For example, during full model training once, a convergence model that sufficiently fits can be obtained only by performing multiple rounds of iteration by using sufficient training data based on a model on which random initialization is performed. Because data released in the Internet is massive, and model training itself takes relatively long time, a large amount of calculation is involved, and time of the model training is made longer, and therefore the requirement for quickly updating the model cannot be met.

For the problem that the data processing model cannot be quickly updated, no effective solution has been provided.

SUMMARY

One or more exemplary embodiments provide a data processing method and apparatus, to solve at least the technical problem in the related technology that a data processing model cannot be quickly updated.

To solve the foregoing problem, various aspects of exemplary embodiments are provided.

According to a first aspect of an exemplary embodiment, provided is a data processing method. First to-be-processed data input into a neural network are obtained, the neural network being a to-be-updated model. Iterative training is performed on the neural network for a first preset number of times by using first target data in the first to-be-processed data, to obtain a seed model of the neural network. The first target data is located in a first time window, and the seed model is an initialization model of the neural network. First newly added data generated after an elapse of time corresponding to the first time window is obtained, and the first newly added data and the first to-be-processed data are combined into second to-be-processed data. Iterative training is performed on the seed model for a second preset number of times by using second target data in the second to-be-processed data, to obtain a first incremental model of the neural network. The second target data is located in a second time window, and a first preset area overlaps between the second time window and the first time window. The first incremental model is published online.

In a possible implementation of the first aspect, a right boundary of the second time window conforms with current time.

In a possible implementation of the first aspect, after the first incremental is published online, the method further includes:

determining a third time window according to first time and the second time window, where there is a second preset overlapping area between the third time window and the second time window;

obtaining second newly added data generated after time corresponding to the second time window, and combining the second newly added data and the second to-be-processed data into third to-be-processed data;

performing iterative training on the first incremental model for a third preset number of times by using third target data in the third to-be-processed data, to obtain a second incremental model of the neural network, where the third target data is located in the third time window; and publishing the second incremental model online.

In this implementation, after the second newly added data is generated, the model does not need to be trained from the beginning; instead, the second newly added data is combined with the second to-be-processed data into the third to-be-processed data, and then the iterative training is performed on the first incremental model for the third preset number of times by using the third target data in the third to-be-processed data, to obtain the second incremental model of the neural network, so that the speed of updating an online model is greatly accelerated, thereby more quickly reflecting the effect of user behavior changes and new data online.

In a possible implementation of the first aspect, a right boundary of the third time window conforms with the first time.

In a possible implementation of the first aspect, the determining a third time window according to first time and the second time window includes:

determining whether there is indication information for pushing a new model, where the new model includes the second incremental model; and determining the first time as a right boundary of the third time window if it is determined that there is the indication information;

sliding the second time window to the right boundary of the third time window, and pushing the right boundary of the third time window forward by a length of the third time window, to obtain a left boundary of the third time window; and determining the third time window according to the right boundary of the third time window and the left boundary of the third time window.

In a possible implementation of the first aspect, after the first incremental is published online, the method further includes:

determining, according to a preset period, whether failure data exists in the first incremental model, where the failure data is the first to-be-processed data stopped to be pushed;

clearing the failure data from the first incremental model to obtain an updated incremental model if it is determined according to the preset period that the failure data exists in the first incremental model; and publishing the updated incremental model online.

In this implementation, it is determined, according to the preset period, that failure data exists in the first incremental model, then the failure data is cleared from the first incremental model to obtain the updated incremental model, in which there is no failure data, and subsequently, the updated incremental model is published online, so as to make the model keep a suitable size, avoid consistent expansion of the size of the model and release of meaningless data, thereby quickly updating a data processing model.

In a possible implementation of the first aspect, the clearing the failure data from the first incremental model to obtain an updated incremental model includes:

expanding the second time window by a preset multiple, to obtain a fourth time window; and obtaining the second to-be-processed data in the first incremental model, using the second to-be-processed data as the failure data, where the second to-be-processed data is not in the fourth time window, and clearing the failure data from the first incremental model to obtain the updated incremental model.

In a possible implementation of the first aspect, after the updated incremental mode is pushed online, the method further includes:

determining a fifth time window according to second time and the fourth time window, where there is a third preset overlapping area between the fifth time window and the fourth time window;

obtaining third newly added data generated after time corresponding to the fourth time window, and combining the third newly added data and the second to-be-processed data into fourth to-be-processed data;

performing iterative training on the updated incremental model for a fourth preset number of times by using fourth target data in the fourth to-be-processed data, to obtain a third incremental model of the neural network, where the fourth target data is located in the fifth time window; and publishing the third incremental model online.

In a possible implementation of the first aspect, a right boundary of the fifth time window conforms with the second time.

In a possible implementation of the first aspect, after performing the iterative training on the seed model for the second preset number of times by using the second target data, to obtain the first incremental model of the neural network, the method further includes:

fitting historical data by using the first incremental model to obtain a fitting result, where the historical data is processed to-be-processed data; and carrying the fitting result by using the first incremental model.

In this implementation, after the first incremental model of the neural network is obtained by performing the iterative training on the seed model for the second preset number of times by using the second to-be-processed data in the second time window, the historical data is fitted by using the first incremental model, to obtain the fitting result, and the fitting result is carried by using the first incremental model, so that model incremental training makes the model permanently carry a fitting state for all historical data, thereby improving the accuracy of fitting pre-estimation.

In a possible implementation of the first aspect, the performing iterative training on the neural network for a first preset number of times by using first target data in the first to-be-processed data includes:

in a cold start state, performing random initialization on parameters of layers of the neural network, to obtain an initialization parameter, where the cold start state is a state when the neural network is processed for a first time; and performing the iterative training on the neural network for the first preset number of times by using the first target data and the initialization parameter, to obtain the seed model of the neural network.

In a possible implementation of the first aspect, the performing random initialization on parameters of layers of the neural network includes but is not limited to one of the following methods:

separately performing initialization on the parameters of the layers of the neural network based on a particular constant;

performing even distribution random initialization on the parameters of the layers of the neural network;

performing Gaussian distribution random initialization on the parameters of the layers of the neural network; and performing Xavier initialization on the parameters of the layers of the neural network.

In a possible implementation of the first aspect, the method is applied to a preset scenario, and the preset scenario includes but is not limited to one of the following:

a CTR pre-estimation scenario of a media file;

a training scenario of an image recognition model;

a training scenario of a voice recognition model; and a training scenario of a natural language understanding model.

In a possible implementation of the first aspect, the second preset number of times is less than or equal to the first preset number of times.

In a possible implementation of the first aspect, the third preset number of times is less than or equal to the first preset number of times.

In a possible implementation of the first aspect, the fourth preset number of times is less than or equal to the first preset number of times.

According to a second aspect of an exemplary embodiment, a data processing apparatus is provided. The data processing apparatus includes at least one memory configured to store program code and at least one processor configured to access the at least one memory and operate according to the program code. The program code includes code configured to cause the at least one processor to obtain first to-be-processed data input into a neural network, the neural network being a to-be-updated model; code configured to cause the at least one processor to perform iterative training on the neural network for a first preset number of times by using first target data in the first to-be-processed data, to obtain a seed model of the neural network, the first target data being located in a first time window, and the seed model being an initialization model of the neural network; code configured to cause the at least one processor to obtain first newly added data generated after an elapse of time corresponding to the first time window, and combine the first newly added data and the first to-be-processed data into second to-be-processed data; code configured to cause the at least one processor to perform iterative training on the seed model for a second preset number of times by using second target data in the second to-be-processed data, to obtain a first incremental model of the neural network, the second target data being located in a second time window, a first preset area overlapping between the second time window and the first time window; and code configured to cause the at least one processor to publish the first incremental model online.

In a possible implementation of the second aspect, a right boundary of the second time window conforms with current time.

In a possible implementation of the second aspect, the program code further includes:

code configured to cause the at least one processor to determine a third time window according to first time and the second time window after the first incremental model is published online, where there is a second preset overlapping area between the third time window and the second time window;

code configured to cause the at least one processor to obtain second newly added data generated after time corresponding to the second time window, and combine the second newly added data and the second to-be-processed data into third to-be-processed data;

code configured to cause the at least one processor to perform iterative training on the first incremental model for a third preset number of times by using third target data in the third to-be-processed data, to obtain a second incremental model of the neural network, where the third target data is located in the third time window; and code configured to cause the at least one processor to publish the second incremental model online.

In a possible implementation of the second aspect, a right boundary of the third time window conforms with the first time.

In a possible implementation of the second aspect, the program code further includes:

code configured to cause the at least one processor to determine whether there is indication information for pushing a new model, where the new model includes the second incremental model; and code configured to cause the at least one processor to determine the first time as a right boundary of the third time window when it is determined that there is the indication information, slide the second time window to the right boundary of the third time window, and push the right boundary of the third time window forward by a length of the third time window, to obtain a left boundary of the third time window, and determine the third time window according to the right boundary of the third time window and the left boundary of the third time window.

In a possible implementation of the second aspect, the apparatus further includes:

code configured to cause the at least one processor to determine, according to a preset period, whether failure data exists in the first incremental model after the first incremental model is published online, where the failure data is the first to-be-processed data stopped to be pushed;

code configured to cause the at least one processor to clear the failure data from the first incremental model to obtain an updated incremental model if it is determined according to the preset period that the failure data exists in the first incremental model; and code configured to cause the at least one processor to publish the updated incremental model online.

In a possible implementation of the second aspect, the program code includes:

code configured to cause the at least one processor to expand the second time window by a preset multiple, to obtain a fourth time window;

code configured to cause the at least one processor to obtain the second to-be-processed data in the first incremental model, and use the second to-be-processed data as the failure data, where the second to-be-processed data is not in the fourth time window; and code configured to cause the at least one processor to clear the failure data from the first incremental model to obtain the updated incremental model.

In a possible implementation of the second aspect, the apparatus further includes:

code configured to cause the at least one processor to determine a fifth time window according to second time and the fourth time window, where there is a third preset overlapping area between the fifth time window and the fourth time window;

code configured to cause the at least one processor to obtain third newly added data generated after time corresponding to the fourth time window, and combine the third newly added data and the second to-be-processed data into fourth to-be-processed data;

code configured to cause the at least one processor to perform iterative training on the updated incremental model for a fourth preset number of times by using fourth target data in the fourth to-be-processed data, to obtain a third incremental model of the neural network, where the fourth target data is located in the fifth time window; and code configured to cause the at least one processor to publish the third incremental model online.

In a possible implementation of the second aspect, a right boundary of the fifth time window conforms with the second time.

In a possible implementation of the second aspect, the apparatus further includes:

code configured to cause the at least one processor to fit historical data by using the first incremental model to obtain a fitting result, where the historical data is processed to-be-processed data; and code configured to cause the at least one processor to carry the fitting result by using the first incremental model.

In a possible implementation of the second aspect, the program code includes:

code configured to cause the at least one processor to perform random initialization on parameters of layers of the neural network in a cold start state, to obtain an initialization parameter, where the cold start state is a state when the neural network is processed for a first time; and code configured to cause the at least one processor to perform the iterative training on the neural network for the first preset number of times by using the first target data and the initialization parameter, to obtain the seed model of the neural network.

In a possible implementation of the second aspect, the performing random initialization on parameters of layers of the neural network includes but is not limited to one of the following methods:

separately performing initialization on the parameters of the layers of the neural network based on a particular constant;

performing even distribution random initialization on the parameters of the layers of the neural network;

performing Gaussian distribution random initialization on the parameters of the layers of the neural network; and performing Xavier initialization on the parameters of the layers of the neural network.

In a possible implementation of the second aspect, the apparatus is applied to a preset scenario, and the preset scenario includes but is not limited to one of the following:

a CTR pre-estimation scenario of a media file;

a training scenario of an image recognition model;

a training scenario of a voice recognition model; and a training scenario of a natural language understanding model.

In a possible implementation of the second aspect, the second preset number of times is less than or equal to the first preset number of times.

In a possible implementation of the second aspect, the third preset number of times is less than or equal to the first preset number of times.

In a possible implementation of the second aspect, the fourth preset number of times is less than or equal to the first preset number of times.

For beneficial effects of possible implementations of the parts in the second aspect, refer to beneficial effects of methods corresponding thereto in the first aspect.

According to a third aspect, an exemplary embodiment provides a data processing terminal, including a processor and a memory, the memory being configured to store a program code, and transmit the program code to the processor, and the processor being configured to perform, according to an instruction in the program code, the data processing method described above.

According to a fourth aspect, an exemplary embodiment provides a storage medium, the storage medium being configured to store a program code, and the program code being used to perform the data processing method described above.

According to a fifth aspect, an exemplary embodiment provides a computer program product including an instruction, the computer program product, when running on a computer, causing the computer to perform the data processing method described above.

According to a sixth aspect, an exemplary embodiment provides a data processing method, including:

obtaining, by a data processing device, first to-be-processed data input into a neural network, the neural network being a to-be-updated model;

performing, by the data processing device, iterative training on the neural network for a first preset number of times by using first target data in the first to-be-processed data, to obtain a seed model of the neural network, the first target data being located in a first time window, and the seed model being an initialization model of the neural network;

obtaining, by the data processing device, first newly added data generated after time corresponding to the first time window, and combining the first newly added data and the first to-be-processed data into second to-be-processed data;

performing, by the data processing device, iterative training on the seed model for a second preset number of times by using second target data in the second to-be-processed data, to obtain a first incremental model of the neural network, the second target data being located in a second time window, and there being a first preset overlapping area between the second time window and the first time window; and publishing, by the data processing device, the first incremental model online.

In a possible implementation of the sixth aspect, a right boundary of the second time window conforms with current time.

In a possible implementation of the sixth aspect, after the first incremental is published online, the method further includes:

determining, by the data processing device, a third time window according to first time and the second time window, where there is a second preset overlapping area between the third time window and the second time window;

obtaining, by the data processing device, second newly added data generated after time corresponding to the second time window, and combining the second newly added data and the second to-be-processed data into third to-be-processed data;

performing, by the data processing device, iterative training on the first incremental model for a third preset number of times by using third target data in the third to-be-processed data, to obtain a second incremental model of the neural network, where the third target data is located in the third time window; and publishing, by the data processing device, the second incremental model online.

In a possible implementation of the sixth aspect, a right boundary of the third time window conforms with the first time.

In a possible implementation of the sixth aspect, the determining, by the data processing device, a third time window according to first time and the second time window includes:

determining, by the data processing device, whether there is indication information for pushing a new model, where the new model includes the second incremental model;

determining, by the data processing device, the first time as a right boundary of the third time window if determining that there is the indication information;

sliding, by the data processing device, the second time window to the right boundary of the third time window, and pushing the right boundary of the third time window forward by a length of the third time window, to obtain a left boundary of the third time window; and determining, by the data processing device, the third time window according to the right boundary of the third time window and the left boundary of the third time window.

In a possible implementation of the sixth aspect, after the data processing device publishes the first incremental model online, the method further includes:

determining, by the data processing device according to a preset period, whether failure data exists in the first incremental model, where the failure data is the first to-be-processed data stopped to be pushed;

clearing, by the data processing device, the failure data from the first incremental model to obtain an updated incremental model if determining according to the preset period that the failure data exists in the first incremental model; and publishing, by the data processing device, the updated incremental model.

In a possible implementation of the sixth aspect, the clearing, by the data processing device, the failure data from the first incremental model to obtain an updated incremental model includes:

expanding, by the data processing device, the second time window by a preset multiple, to obtain a fourth time window; and obtaining, by the data processing device, the second to-be-processed data in the first incremental model, using the second to-be-processed data as the failure data, where the second to-be-processed data is not in the fourth time window, and clearing the failure data from the first incremental model to obtain the updated incremental model.

In a possible implementation of the sixth aspect, after the data processing device pushes the updated incremental mode online, the method further includes:

determining, by the data processing device, a fifth time window according to second time and the fourth time window, where there is a third preset overlapping area between the fifth time window and the fourth time window;

obtaining, by the data processing device, third newly added data generated after time corresponding to the fourth time window, and combining the third newly added data and the second to-be-processed data into fourth to-be-processed data;

performing, by the data processing device, iterative training on the updated incremental model for a fourth preset number of times by using fourth target data in the fourth to-be-processed data, to obtain a third incremental model of the neural network, where the fourth target data is located in the fifth time window; and publishing, by the data processing device, the third incremental model online.

In a possible implementation of the sixth aspect, a right boundary of the fifth time window conforms with the second time.

In a possible implementation of the sixth aspect, after performing, by the data processing device, the iterative training on the seed model for the second preset number of times by using the second target data, to obtain the first incremental model of the neural network, the method further includes:

fitting, by the data processing device, historical data by using the first incremental model to obtain a fitting result, where the historical data is processed to-be-processed data; and carrying, by the data processing device, the fitting result by using the first incremental model.

In a possible implementation of the sixth aspect, the performing, by the data processing device, iterative training on the neural network for a first preset number of times by using first target data in the first to-be-processed data includes:

in a cold start state, performing, by the data processing device, random initialization on parameters of layers of the neural network, to obtain an initialization parameter, where the cold start state is a state when the neural network is processed for a first time; and performing, by the data processing device, the iterative training on the neural network for the first preset number of times by using the first target data and the initialization parameter, to obtain the seed model of the neural network.

In a possible implementation of the sixth aspect, the performing, by the data processing device, random initialization on parameters of layers of the neural network includes but is not limited to one of the following methods:

separately performing initialization on the parameters of the layers of the neural network based on a particular constant;

performing, by the data processing device, even distribution random initialization on the parameters of the layers of the neural network;

performing, by the data processing device, Gaussian distribution random initialization on the parameters of the layers of the neural network; and performing, by the data processing device, Xavier initialization on the parameters of the layers of the neural network.

In a possible implementation of the sixth aspect, the method is applied to a preset scenario, and the preset scenario includes one of the following:

a CTR pre-estimation scenario of a media file;

a training scenario of an image recognition model;

a training scenario of a voice recognition model; and a training scenario of a natural language understanding model.

In a possible implementation of the sixth aspect, the second preset number of times is less than or equal to the first preset number of times.

In a possible implementation of the sixth aspect, the third preset number of times is less than or equal to the first preset number of times.

In a possible implementation of the sixth aspect, the fourth preset number of times is less than or equal to the first preset number of times.

For beneficial effects of possible implementations of the parts in the sixth aspect, refer to beneficial effects of methods corresponding thereto in the first aspect.

In the embodiments, first to-be-processed data input into a neural network is obtained, the neural network being a to-be-updated model, iterative training is performed on the neural network for a first preset number of times by using first target data, located in a first time window, in the first to-be-processed data, to obtain a seed model of the neural network, the seed model being an initialization model of the neural network, first newly added data generated after time corresponding to the first time window is obtained, and the first newly added data is combined with the first to-be-processed data into second to-be-processed data; iterative training is performed on the seed model for a second preset number of times by using second target data, located in a second time window, in the second to-be-processed data, to obtain a first incremental model of the neural network, there being a first preset overlapping area between the second time window and the first time window, and the first incremental model is published online. In this way, for update training of a data processing model, after newly added data is generated, the model does not need to be trained from the beginning. Instead, iterative training is directly performed on a seed model for a preset number of times by using target data including the newly added data based on the seed model, to obtain an incremental model of a neural network, and the incremental model is published online, so as to update and publish the incremental model, thereby quickly updating the data processing model, and therefore the problem that the data processing model cannot be quickly updated is solved.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

Figure 1:
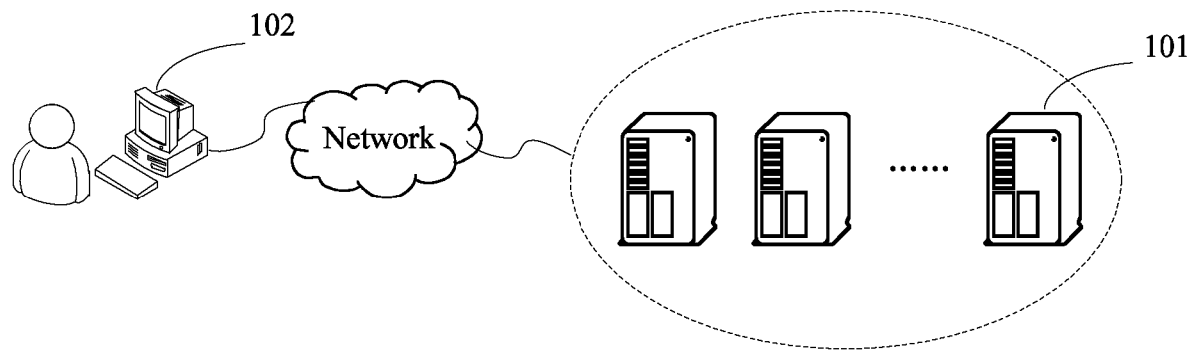
FIG. 1 is a schematic diagram of a hardware environmental of a data processing method according to an exemplary embodiment.

To enable a person skilled in the art to better understand the solutions of the disclosure, the following clearly and completely describes the technical solutions in the embodiments with reference to the accompanying drawings in the embodiments. Apparently, the described embodiments are merely some but not all of the embodiments. All other embodiments obtained by a person of ordinary skill in the art based on the embodiments without creative efforts shall fall within the protection scope.

It should be noted that in the specification, claims, and accompanying drawings, the terms "first", "second", and so on are intended to distinguish between similar objects rather than indicating a specific order. It should be understood that such used data can be exchanged with each other in appropriate cases, so that the embodiments that are described herein can be implemented in a sequence other than the sequences shown in the figures or described herein. Moreover, the terms "include", "comprise", and any variants thereof are intended to cover a non-exclusive inclusion. For example, a process, method, system, product, or device that includes a list of operations or units is not necessarily limited to those operations or units that are clearly listed, but may optionally further include other operations or units not expressly listed or inherent to such a process, method, product, or device.

To solve the problem that a data processing model cannot be quickly updated in conventional data processing manners, an effective data processing method needs to be considered. Therefore, embodiments provide a data processing method and apparatus, to update an incremental model, and quickly update a data processing model, thereby solving the problem that a data processing model cannot be quickly updated.

In the exemplary embodiments, the data processing model may fit historical exposure data by means of learning, and has the function of pre-estimating a click-through rate of data clicks in a future period of time. For example, an advertisement click-through rate pre-estimation model in data processing has the function of pre-estimating an advertisement click-through rate in a future period of time.

Therefore, the data processing method provided in the exemplary embodiments may be applied to a preset scenario. In the preset scenario, click stream data is enormously generated, and a large amount of exposure data may be generated each day. For example, in a click-through rate (or referred to as "CTR") pre-estimation scenario of a media file, a large number of users view files by clicking different media files each day. For another example, in an Internet advertisement scenario, a large amount of advertisement exposure data is generated each day. Because the advertisement exposure data includes context features such as advertisement content, user content, and time, the advertisement exposure data is valuable annotated data. Whether data is annotated data may be determined according to whether a user clicks the data.

On one hand, because user behaviors and data processing materials on the Internet are time-varying, correspondingly, a model for pre-estimating a click-through rate needs to be quickly updated. On the other hand, because a click-through rate pre-estimation model is required to learn unchanged attributes of a user click behavior mode by fitting mass historical data, for update training of a data processing model, if a previously trained model is discarded each time, and model training is performed from the beginning, great waste will be caused. For example, if a model M that sufficiently fits a previous batch of historical data D is obtained by means of training, after a period of time, new data D' generated in this period of time needs to be learned. In the requirement for obtaining a new model (having both fitting for the data D and fitting for the data D') by means of training, completely discarding the model M is wasteful.

Therefore, in the exemplary embodiments, a data processing model may be trained by using an incremental update method. For example, an advertisement click-through rate pre-estimation model is trained by using the incremental update method. In this way, for update training of a data processing model, the model does not need to be trained from the beginning. Instead, when a new model needs to be obtained by means of training, the data processing model is trained by using an incremental update method, so as to update the incremental model, thereby quickly updating the data processing model.

For example, the exemplary embodiments may be applied to a hardware environment shown in FIG. 1. FIG. 1 is a schematic diagram of a hardware environment of a data processing method according to an exemplary embodiment. In the hardware environment, at least a server 101 and a terminal 102 are included. As shown in FIG. 1, the server 101 may be communicatively connected to the terminal 102 by using a network. The network may be a wide area network, a metropolitan area network, or a local area network. Certainly, the network may also be a network of another type. The type of the network is not limited herein.

In the hardware environment, the terminal 102 may be understood as a user terminal. The user terminal may be a smartphone, a tablet computer, an ebook reader, a moving picture experts group audio layer III (or MP3) player, a moving picture experts group audio layer IV (or MP4) player, a laptop portable computer, or a desktop computer.

It should be noted that the data processing method of the embodiments may be performed by the server 101 (or at least one processor in the server 101), the terminal 102 (or at least one processor in the terminal 102), or both the server 101 and the terminal 102. When the terminal 102 performs the data processing method of the embodiments, the method may also be performed by a client mounted on the terminal 102. An execution body of the embodiments is not limited herein, provided that the execution body is a data processing device having a data processing capability.

Embodiment 1

Next, how to implement data processing in this embodiment is described with reference to FIG. 2.

Figure 2:
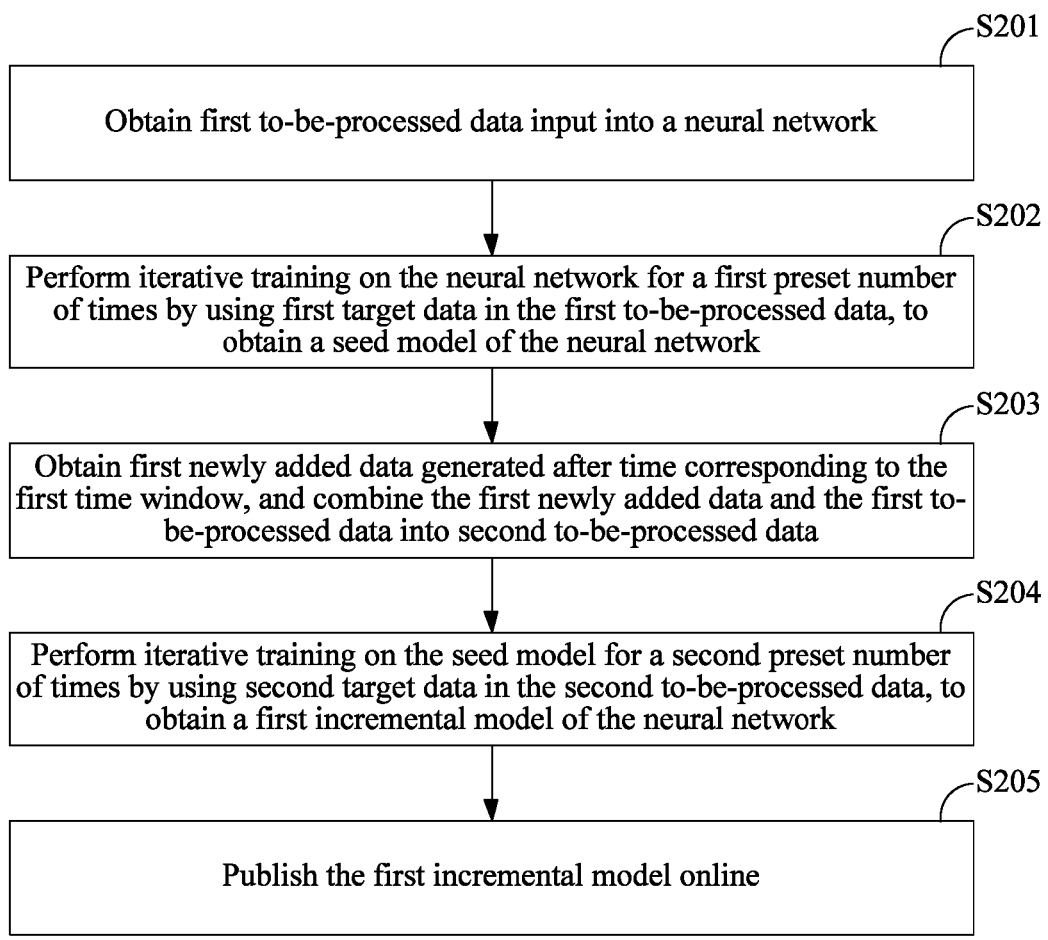
FIG. 2 is a flowchart of a data processing method according to an exemplary embodiment.

FIG. 2 is a flowchart of a data processing method according to an exemplary embodiment. As shown in FIG. 2, the data transmission method may include the following operations:

S201: Obtain first to-be-processed data input into a neural network, the neural network being a to-be-updated model.

The first to-be-processed data input into the neural network may be training data. Because the training data includes an exposure log, the first to-be-processed data may include at least a one-hot encoding vector. The one-hot encoding vector is obtained by performing discretization according to a combination of user features and data features in the exposure log.

For example, in a CTR pre-estimation scenario of a media file, when the CTR pre-estimation scenario is an Internet advertisement scenario, the first to-be-processed data input into a deep neural network may include a one-hot encoding vector. The one-hot encoding vector is obtained by performing discretization according to a combination of user features and data features in each exposure log, and is applicable to deep learning of an advertisement click-through rate pre-estimation scenario.

In this embodiment, one-hot encoding is used as a method for processing an attitude type segmentation feature. For each feature, if the feature has M possible values, after one-hot encoding is performed on the feature, the feature becomes M (0-1) binary features. These binary features are mutually exclusive, and each time only one binary feature can be activated. If a binary feature is activated, a possible value is 1, and if the binary feature is not activated, the possible value is 0. Therefore, after the one-hot encoding, data becomes sparse.

The neural network is a to-be-updated model. For example, the neural network may be a to-be-updated deep neural network. The deep neural network includes nerve cells. Specifically, the deep neural network may be formed by connecting nerve cells of a multilayer perceptron (or referred to as "MLP") neural network having two hidden layers. The deep neural network includes a non-zero element in an input vector, so that participation of nerve cells is needed in each time of back propagation calculation of neural network training. Therefore, the deep neural network is more complex than a common neural network.

S202: Perform iterative training on the neural network for a first preset number of times by using first target data in the first to-be-processed data, to obtain a seed model of the neural network, the first target data being located in a first time window, and the seed model being an initialization model of the neural network.

After the first to-be-processed data input into the neural network is obtained, a data processing model may be initialized. Further, random initialization may be performed on the data processing model.

In a cold start state, retrogressive from current time, the first time window may be determined. The first time window is also a slide data window, and a fixed data window during cold start training. The cold start state is a state when the neural network is processed for a first time, and is a software start state, for example, a processed state after a fault recovery.

Specifically, a time span of the first target data may be obtained by subtracting time corresponding to the first time window from current time. Iterative training may be performed on the neural network for a first preset number of times by using the first target data, located in the first time window, in the first to-be-processed data, so as to obtain a seed model of the neural network. The first preset number of times is the number of times of iteration performed on the neural network by using the first target data, and each time of iteration training has a learning operation.

The seed model is an initialization model of the neural network, and is not published online for the moment. In addition, the seed model is also a first model for starting model incremental update training, and may be obtained by performing a plurality of rounds of iteration training by using time window data by means of cold start and random initialization. Certainly, in addition to the foregoing implementation, the seed model of the neural network may also be obtained by training an iteration of the model by using click exposure data in the first time window.

S203: Obtain first newly added data generated after an elapse of time corresponding to the first time window, and combine the first newly added data and the first to-be-processed data into second to-be-processed data.

After the seed model of the neural network is obtained by performing the iterative training on the neural network for the first preset number of times by using the first target data, as time passes by, if first newly added data is generated after an elapse of time corresponding to the first time window, the first newly added data may be obtained, and the first newly added data is combined with the first to-be-processed data to obtain the second to-be-processed data, and the second to-be-processed data is a subsequent data object for processing.

S204: Perform iterative training on the seed model for a second preset number of times by using second target data, located in a second time window, in the second to-be-processed data, to obtain a first incremental model of the neural network, there being a first preset overlapping area between the second time window and the first time window, and the second preset number of times being less than or equal to the first preset number of times.

After the seed model of the neural network is obtained by performing the iterative training on the neural network for the first preset number of times by using the first target data, a new model is trained by means of performing incremental updating on the seed model, that is, incremental update training is performed once on the seed model.

In this embodiment, the second time window may be obtained by using the first time window. For example, the first time window may be slid based on the seed model, so that the right boundary of the slid first time window conforms with the current time. In this case, the right boundary of the slid first time window may be used as the right boundary of the second time window. That is, the right boundary of the second time window may conform with the current time. Then, the length of the second time window is obtained. Next, the right boundary of the second time window is pushed forward by the length of the second time window to obtain the left boundary of the second time window. After the left and right boundaries of the second time window are obtained, the second time window may be obtained.

After the second time window is obtained, the first incremental model may be obtained by training iteration of the model for a second preset number of times by using the second target data in the second time window. The first incremental model may pre-estimate a click-through rate of data when pushed online. Each time of iterative training has a learning operation. In an implementation, the second preset number of times may be less than or equal to the first preset number of times. Certainly, in addition to the foregoing implementation, optionally, the first incremental model may further be obtained by training iteration of the model for a second preset number of times by using advertisement click exposure data in the second time window. The first incremental model may pre-estimate an advertisement click-through rate when pushed online.

It should be noted that in this embodiment, the length of the second time window may be the same as or different from the length of the first time window. The length of the second time window is not limited herein.

For example, when the time length of the first time window is the same as the length of the second time window, it is assumed that the length of the first time window and the length of the second time window are both 23 hours, the left boundary of the first time window is 00:00 of a day, the right boundary of the first time window is 23:00 that day, and the current time is 23:10. Because the right boundary of the first time window is 10 minutes earlier than the current time, the first time window needs to be slid rightward by 10 minutes to obtain that the left boundary of the second time window is 00:10 that day, and the right boundary of the second time window is 23:10 that day (that is, the current time), thereby determining the second time window according to the current time and the first time window.

For example, when the time length of the first time window is different from the length of the second time window, it is assumed that the length of the first time window is 23 hours, the left boundary of the first time window is 00:00 of a day, the right boundary of the first time window is 23:00 that day, the length of the second time window is 22 hours, and the current time is 23:10. Because the right boundary of the first time window is 10 minutes earlier than the current time, the right boundary of the first time window needs to be slid rightward by 10 minutes to obtain that the right boundary of the second time window is 23:10 that day (that is, the current time), and the left boundary of the second time window is obtained by pushing the right boundary of the second time window forward by 22 hours, that is, the left boundary of the second time window is 01:10 that day, thereby determining the second time window according to the current time and the first time window.

S205: Publish the first incremental model online.

After the first incremental model of the neural network is obtained by performing iterative training on the seed model for a second preset number of times by using the second target data, the first incremental model is published online. That is, the first incremental model is pushed online for pre-estimating a click-through rate of data until pushing of a new model next time.

It should be noted that the in the process of update training on the first incremental model, a model learning operation should be suitably reduced, to prevent some trained weights from leaving optimal points. Therefore, in a possible implementation of this embodiment, the learning operation should be less than or equal to a learning operation used in a last iteration in the training phase of the seed model.

Incremental update training is performed on a data processing model, and the number of times of iteration that needs to be trained each time is less than or equal to the number of times of iteration needed by a fixed data window. Therefore, the speed of updating an online model is greatly accelerated, thereby more quickly reflecting the effect of user behavior changes and new data online. In addition, because the model can memorize user information and data information in a more lasting way, fitting on data long-time release behaviors and user click behaviors is more accurate.

It should be noted that when incremental models increase by a number of hundreds, a deep neural network has a stronger expression capability, has a stronger capability of fitting nonlinear features of data, and has a stronger capability of processing a plurality of weights of the incremental models, so as to more accurately pre-estimate the CTR, thereby improving the capability of pre-estimating an advertisement click-through rate. The foregoing technical solution is preferably applicable to a method for processing the first to-be-processed data in the deep neural network.

By using the foregoing S201 to S205, first to-be-processed data input into a neural network is obtained, the neural network being a to-be-updated model, iterative training is performed on the neural network for a first preset number of times by using first target data, located in a first time window, in the first to-be-processed data, to obtain a seed model of the neural network, the seed model being an initialization model of the neural network, first newly added data generated after an elapse of time corresponding to the first time window is obtained, and the first newly added data is combined with the first to-be-processed data into second to-be-processed data; and iterative training is performed on the seed model for a second preset number of times by using second target data, located in a second time window, in the second to-be-processed data, to obtain a first incremental model of the neural network, there being a first preset overlapping area between the second time window and the first time window. In an implementation, the second preset number of times may be less than or equal to the first preset number of times. The first incremental model is published online, so as to solve the problem that a data processing model cannot be quickly updated, thereby quickly updating the data processing model.

According to the foregoing embodiment, after the seed model and the first incremental model of the neural network are obtained, to avoid time overhead brought by training the model from the beginning, to quickly update the model in data processing, as an optional embodiment, after the first incremental model is published online, a third time window is determined according to first time and the second time window, iterative training is performed on the first incremental model for a third preset number of times by using third target data, located in a third time window, in the third to-be-processed data, to obtain a second incremental model of the neural network, and the second incremental model is published online. Next, the implementation manner will be described in detail with reference to FIG. 3.

Figure 3:
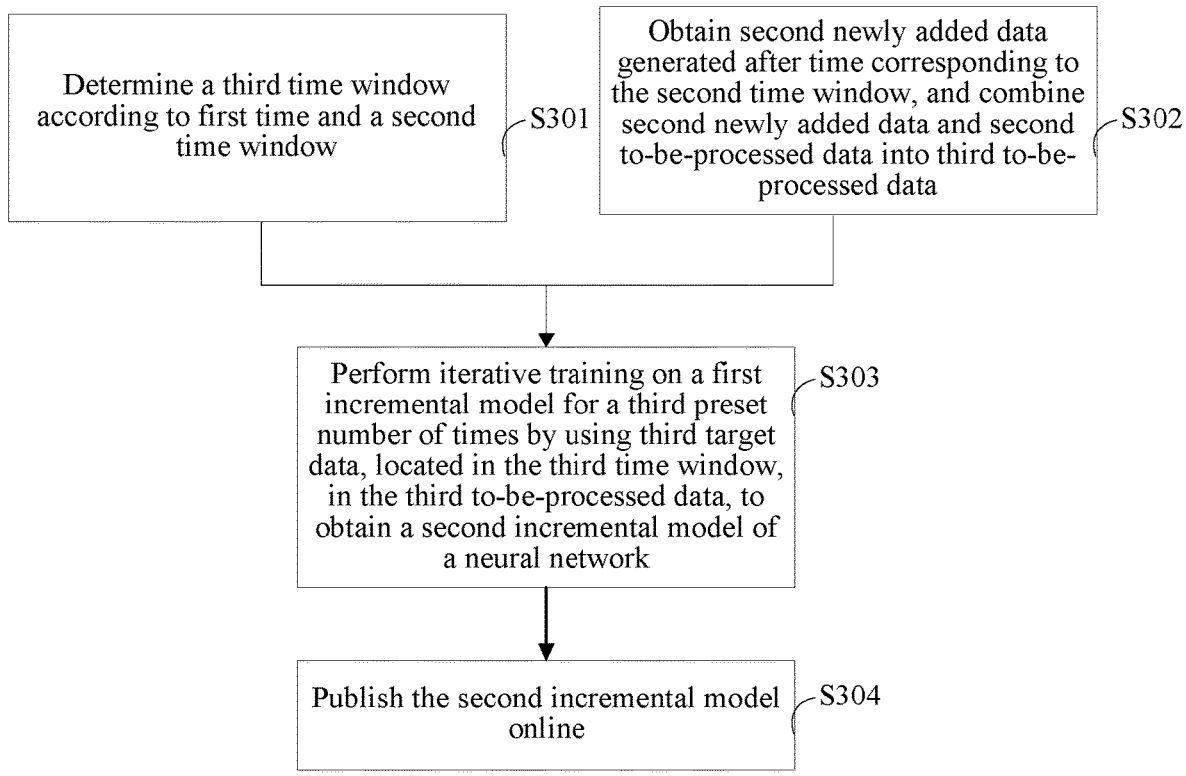
FIG. 3 is another flowchart of a data processing method according to an exemplary embodiment.

FIG. 3 is a flowchart of another data processing method according to an exemplary embodiment. As shown in FIG. 3, the data processing method further includes the following operations:

S301: Determine a third time window according to first time and the second time window.

In the technical solution provided in the foregoing S301, the third time window is determined according to the first time and the second time window after the first incremental model is published online, where there is a second preset overlapping area between the third time window and the second time window.

Specifically, after the first incremental model is published online, incremental update training is performed on the model in data processing for a second time. The second time window is slided based on the first incremental model, so that the right boundary of the slided second time window conforms with the first time, and the first time is determined as the right boundary of the third time window, that is, the right boundary of the third time window conforms with the first time, so as to obtain the third time window. There is an overlapping area in time between the third time window and the second time window. It should be noted that the first time may be any time, and certainly, the first time may also be understood as current time corresponding to the incremental update training for the second time.

It should be noted that in this embodiment, the specific implementation of determining the third time window according to the first time and the second time window will be described in detail below.

S302: Obtain second newly added data generated after an elapse of time corresponding to the second time window, and combine the second newly added data and the second to-be-processed data into third to-be-processed data.

In the technical solution provided in the foregoing S302, as time passes by, the second newly added data is generated after the time corresponding to the second time window, and is obtained, and then is combined with the second to-be-processed data into the third to-be-processed data, which is a data object for subsequent processing.

S303: Perform iterative training on the first incremental model for a third preset number of times by using third target data, located in a third time window, in the third to-be-processed data, to obtain a second incremental model of the neural network, where the third target data is located in the third time window.

In the technical solution provided in the foregoing S303, after the third time window is determined according to the first time and the second time window, a new model is trained by means of performing incremental updating on the first incremental model, that is, incremental update training is performed once on the first incremental model. The second incremental model is obtained by training iteration of the model for a third preset number of times by using the third target data in the third time window. The second incremental model may pre-estimate a click-through rate of data when pushed online. Each time of iterative training has a learning operation. In an implementation, the third preset number of times may be less than or equal to the first preset number of times. Certainly, in addition to the foregoing implementation, optionally, the second incremental model may further be obtained by training iteration of the model for a third preset number of times by using advertisement click exposure data in the third time window. The second incremental model may pre-estimate an advertisement click-through rate when pushed online.

According to this embodiment, when a deep learning model for pre-estimating an advertisement click-through rate is trained based on mass data, time overhead brought by training the model from the beginning can be avoided, thereby quickly updating the model.

S304: Publish the second incremental model online.

After the second incremental model of the neural network is obtained by performing iterative training on the seed model for a third preset number of times by using the third target data, the second incremental model is published online. That is, the second incremental model is pushed online for pre-estimating a click-through rate of data until pushing of a new model next time.

It should be noted that the in the process of update training on the second incremental model, a model learning operation should be suitably reduced, to prevent some trained weights from leaving optimal points. Therefore, in a possible implementation of this embodiment, the learning operation should be less than or equal to a learning operation used in a last iteration in the training phase of the seed model.

For update training of a data processing model, after the second newly added data is generated, the model does not need to be trained from the beginning; instead, the second newly added data is combined with the second to-be-processed data into the third to-be-processed data, and then the iterative training is performed on the first incremental model for the third preset number of times by using the third target data in the third to-be-processed data, to obtain the second incremental model of the neural network. In addition, the number of times of iteration that needs to be trained each time is less than or equal to the number of times of iteration needed by a fixed data window. Therefore, the speed of updating an online model is greatly accelerated, thereby more quickly reflecting the effect of user behavior changes and new data online. In addition, because the model can memorize user information and data information in a more lasting way, fitting on data long-time release behaviors and user click behaviors is more accurate.

In this embodiment, a third time window is determined according to first time and the second time window after the first incremental model is published online, where there is a second preset overlapping area between the third time window and the second time window; second newly added data generated after an elapse of time corresponding to the second time window is obtained, and the second newly added data is combined with the second to-be-processed data into third to-be-processed data; iterative training is performed on the first incremental model for a third preset number of times by using third target data, located in the third time window, in the third to-be-processed data, to obtain a second incremental model of the neural network; and the second incremental model is published online, so as to update the model in data processing, thereby quickly updating the model in data processing.

As an optional embodiment, the operation "determining a third time window according to first time and the second time window" in S301 may include: determining the first time as a right boundary of the third time window if it is determined that there is indication information for pushing a new model, sliding the second time window to the right boundary of the third time window, and pushing the right boundary of the third time window forward by a length of the third time window, to obtain a left boundary of the third time window; and determining the third time window according to the right boundary of the third time window and the left boundary of the third time window.

Next, how to determine the third time window according to the first time and the second time window in this embodiment is described with reference to FIG. 4.

Figure 4:
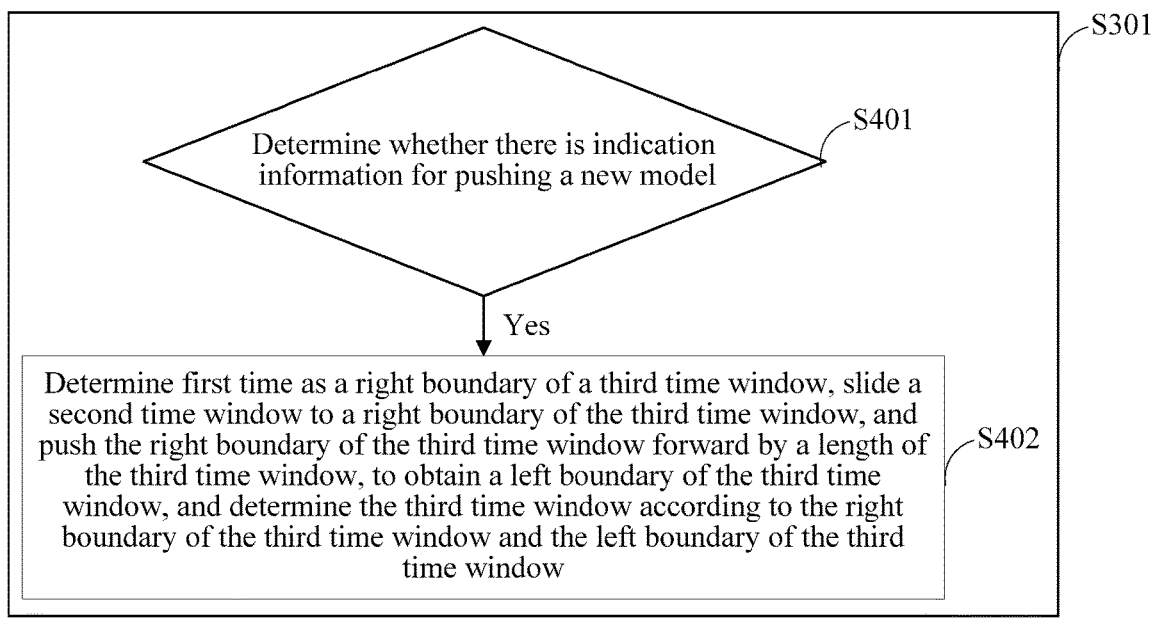
FIG. 4 is a flowchart of a method for determining a third time window according to first time and a second time window according to an exemplary embodiment.

FIG. 4 is a flowchart of a method for determining a third time window according to first time and a second time window according to an exemplary embodiment. As shown in FIG. 4, the method for determining a third time window according to first time and a second time window includes the following operations:

S401: Determine whether there is indication information for pushing a new model, where the new model includes the second incremental model.

After the first incremental model is published online, whether there is indication information for pushing a new model needs to be determined. The new model includes the second incremental model. That is, whether there is indication information for pushing the second incremental model needs to be determined.

S402: Determine the first time as a right boundary of the third time window, slide the second time window to the right boundary of the third time window, and push the right boundary of the third time window forward by a length of the third time window, to obtain a left boundary of the third time window, and determine the third time window according to the right boundary of the third time window and the left boundary of the third time window.

In the technical solution provided in the foregoing S402, if it is determined by using S401 that there is indication information for pushing a new model, the first time may be determined as the right boundary of the third time window. Specifically, the second time window may be slided to first time, so that the right boundary of the slided second time window conforms with the first time, so as to obtain the right boundary of the third time window. Next, the right boundary of the third time window is pushed forward by a length of the third time window, so that the left boundary of the third time window can be obtained, and therefore the third time window can be determined according to the right boundary of the third time window and the left boundary of the third time window.

Specifically, after whether there is indication information for pushing a new model is determined by using S401, if it is determined that there is the indication information, incremental update training is performed on the data processing model for a second time. The second time window may be slided based on the first incremental model, so that the right boundary of the slided second time window conforms with the first time, and the right boundary of the slided second time window is the right boundary of the third time window. Then, the length of the third time window is obtained. Next, the right boundary of the third time window is pushed forward by the length of the third time window to obtain the left boundary of the third time window. The third time window may be determined according to the right boundary and the left boundary of the third time window after the left and right boundaries of the third time window are obtained.

It should be noted that in this embodiment, the length of the third time window may be the same as or different from the length of the second time window. The length of the third time window is not limited thereto.

For example, when the time length of the second time window is the same as the length of the third time window, it is assumed that the length of the second time window and the length of the third time window are both 23 hours, the left boundary of the second time window is 00:00 of a day, the right boundary of the second time window is 23:00 that day, and the first time is 23:10. Because the right boundary of the second time window is 10 minutes earlier than the first time, the second time window needs to be slided rightward by 10 minutes to obtain that the left boundary of the third time window is 00:10 that day, and the right boundary of the third time window is 23:10 that day (that is, the first time), thereby determining the third time window according to the first time and the second time window.

For example, when the time length of the second time window is different from the length of the third time window, it is assumed that the length of the second time window is 23 hours, the left boundary of the second time window is 00:00 of a day, the right boundary of the second time window is 23:00 that day, the length of the third time window is 22 hours, and the first time is 23:10. Because the right boundary of the second time window is 10 minutes earlier than the first time, the right boundary of the second time window needs to be slided rightward by 10 minutes to obtain that the right boundary of the third time window is 23:10 that day (that is, the first time), and the left boundary of the third time window is obtained by pushing the right boundary of the third time window forward by 22 hours, that is, the left boundary of the third time window is 01:10 that day, thereby determining the third time window according to the first time and the second time window.

According to this embodiment, whether there is indication information for pushing a new model is determined, where the new model includes the second incremental model; the first time is determined as a right boundary of the third time window if it is determined that there is the indication information; the second time window is slided to the right boundary of the third time window, and the right boundary of the third time window is pushed forward by a length of the third time window, to obtain a left boundary of the third time window; and the third time window is determined according to the right boundary of the third time window and the left boundary of the third time window, thereby determining the third time window according to the first time and the second time window.

After the seed model of the neural network is obtained by means of training, a new model is trained by means of incremental updating each time. In this way, as time passes by, updated increments constantly accumulate. Consequently, the size of the model constantly expands, and occupies a relatively large storage space. In addition, in an application scenario of data, each piece of data has a life cycle. When time of data release exceeds preset release data, the data is discontinued and release of the data is stopped.

This type of data becomes failure data, and it is meaningless to pre-estimate discontinued data hereinafter.

Therefore, in an optional embodiment, after the first incremental model is published online, when it is determined according to a preset period that failure data exists in the first incremental model, the failure data may be cleared from the first incremental model, to obtain an updated incremental model, and the updated incremental model is published online. Next, the implementation manner will be described in detail with reference to FIG. 5.

Figure 5:
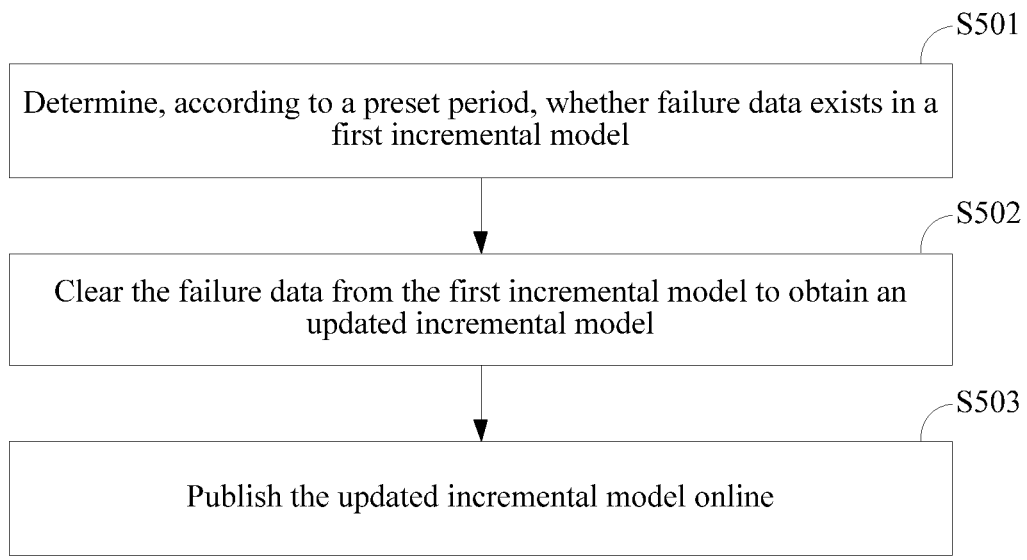
FIG. 5 is another flowchart of a data processing method according to an exemplary embodiment.

FIG. 5 is a flowchart of another data processing method according to an exemplary embodiment. As shown in FIG. 5, the data processing method further includes the following operations:

S501: Determine, according to a preset period, whether failure data exists in the first incremental model.

In the technical solution provided in the foregoing S501, whether failure data exists in the first incremental model is determined according to a preset period after the first incremental model is published online, where the failure data is the first to-be-processed data stopped to be pushed.

Because failure data is periodically cleared from the model, a key value of the failure data may be periodically cleared from the model. Therefore, for the first incremental model, after the first incremental model is published online, whether the failure data exists the first incremental model can be determined according to the preset period.

S502: Clear the failure data from the first incremental model to obtain the updated incremental model.

In the technical solution provided in the foregoing S502, the failure data is cleared from the first incremental model to obtain an updated incremental model if it is determined according to the preset period that the failure data exists in the first incremental model.

After whether the failure data exists the first incremental model is determined according to the preset period, if it is determined according to the preset period that the failure data exists in the first incremental model, that is, data in the first incremental model is discontinued and stops being released as time passes by, then data that is discontinued and that stops being released is cleared from the first incremental model to obtain an updated incremental model in which there is no failure data, so as to make the model keep a suitable size, avoid consistent expansion of the size of the model and release of meaningless data.

S503: Publish the updated incremental model online.

After the updated incremental model in which there is no failure data is obtained by clearing the failure data from the first incremental model, the updated incremental model is pushed online, to pre-estimate a click-through rate of data.

According to this embodiment, after the first incremental model is published online, whether failure data exists in the first incremental model is determined according to a preset period, where the failure data may be the first to-be-processed data stopped to be pushed. If it is determined, according to the preset period, that failure data exists in the first incremental model, then the failure data is cleared from the first incremental model to obtain the updated incremental model, in which there is no failure data, and subsequently, the updated incremental model is published online, so as to make the model keep a suitable size, avoid consistent expansion of the size of the model and release of meaningless data, thereby quickly updating a data processing model.

As an optional embodiment, the operation "clearing the failure data from the first incremental model to obtain the updated incremental model" in S502 may include: obtaining the second to-be-processed data that is not in a fourth time window obtained by expanding the second time window by a preset multiple and that is in the first incremental model, using the second to-be-processed data, not in the fourth time window, in the first incremental model as the failure data, and clearing the failure data from the first incremental model, to obtain the updated incremental model.

Next, how to clear the failure data from the first incremental model to obtain the updated incremental model in this embodiment is described with reference to FIG. 6.

Figure 6:
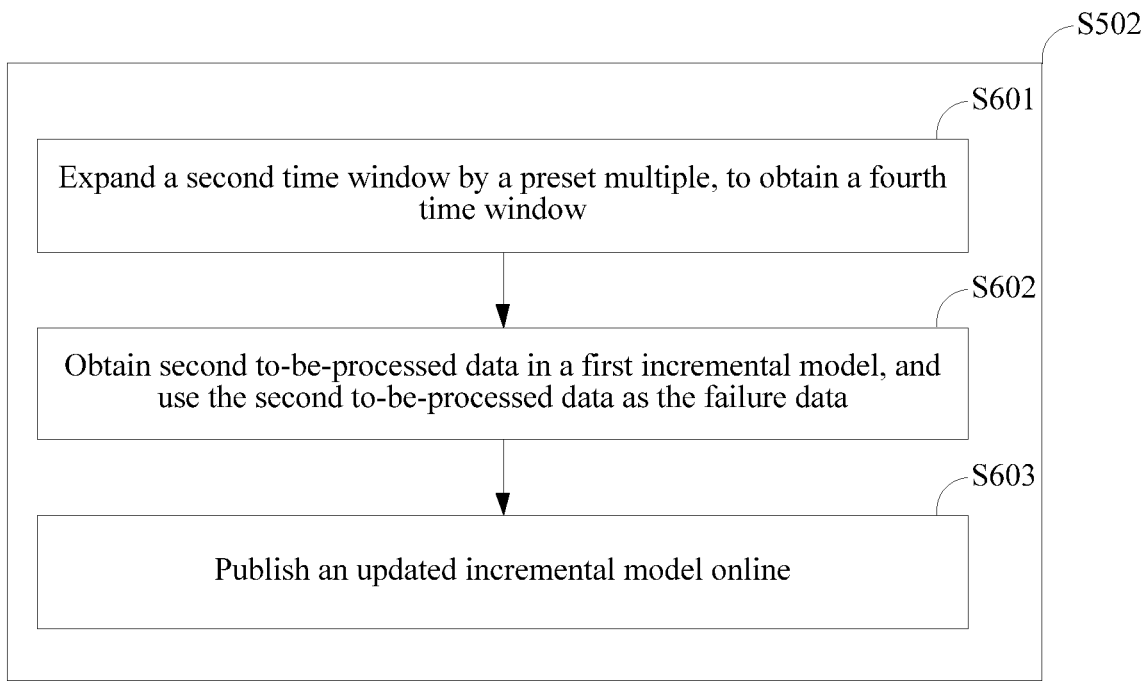
FIG. 6 is a flowchart of a method for clearing failure data from a first incremental model according to an exemplary embodiment.

FIG. 6 is a flowchart of a method for clearing failure data from a first incremental model according to an exemplary embodiment. As shown in FIG. 6, the method for clearing failure data from a first incremental model to obtain an updated incremental model includes the following operations:

S601: Expand the second time window by a preset multiple, to obtain a fourth time window.

After the first incremental model is published online, if it is determined according to the preset period that the failure data exists in the first incremental model, the second time window is expanded by a preset multiple of time extension, to obtain the fourth time window. The fourth time window is also used as a barrier. That is, a boundary of the fourth time window is used as a limit for determining whether data is the failure data. If the data is in located in the fourth time window, it may be considered that the data is not the failure data; if the data is not located in the fourth time window, it may be considered that the data is the failure data.

S602: Obtain the second to-be-processed data in the first incremental model, and use the second to-be-processed data as the failure data, where the second to-be-processed data is not in the fourth time window.

After the fourth time window is obtained by expanding the second time window by the preset multiple, data that is not located in the fourth time window may be considered as failure data. Therefore, the second to-be-processed data, not in the fourth time window, in the first incremental model may be obtained, and the second to-be-processed data is used as the failure data in the first incremental model. That is, features, not in the fourth time window, in the first incremental model may be obtained and may be used as the failure date in the first incremental model. The features, not in the fourth time window, in the first incremental model may represent nerve cells in a neural network.

S603: Clear the failure data from the first incremental model to obtain the updated incremental model.

After the second to-be-processed data, not in the fourth time window, in the first incremental model is obtained, the second to-be-processed data may be used as the failure data in the first incremental model. Next, the second to-be-processed data (that is, the failure data) is cleared from the first incremental model, to obtain the updated incremental model. That is, features, not in the fourth time window, in the first incremental model are cleared to obtain the updated incremental model.

The foregoing method for clearing the failure data is also applicable to a method for clearing the failure data from the second incremental model and a method for clearing failure data in a subsequently generated new model in the process of subsequent model training.

According to this embodiment, the second time window is expanded by a preset multiple, to obtain the fourth time window; the second to-be-processed data, not in the fourth time window, in the first incremental model is obtained, and the second to-be-processed data, not in the fourth time window, in the first incremental model is used as the failure data, and the failure data is cleared from the first incremental model to obtain the updated incremental model, so as to clear the failure data from the first incremental model, to obtain the updated incremental model, so as to make the model keep a suitable size, thereby quickly updating a data processing model.

As an optional embodiment, after the updated incremental model is pushed online, the fifth time window may be determined according to second time and a fourth time window, and iterative training is performed on the updated incremental model for a fourth preset number of times according to fourth to-be-processed data in the fifth time window, to obtain a third incremental model of a neural network, and the third incremental model is published online. Next, the implementation manner will be described in detail with reference to FIG. 7.

Figure 7:
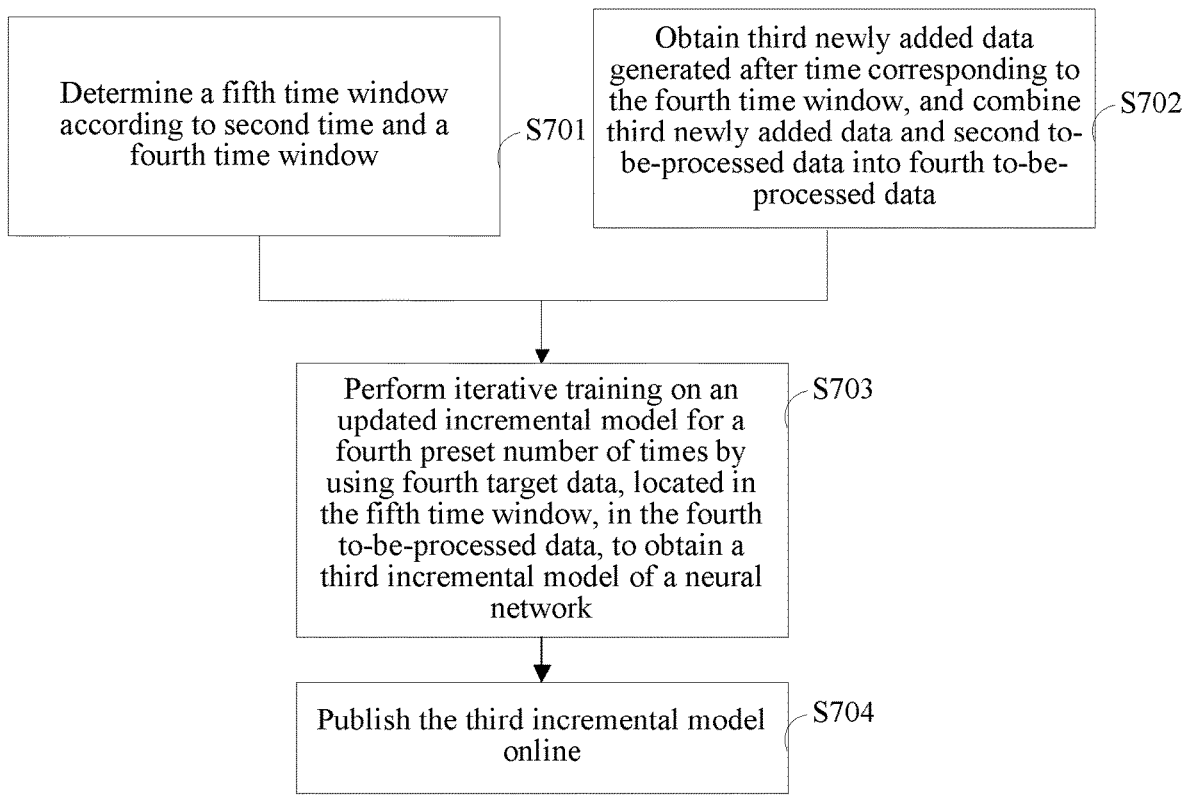
FIG. 7 is another flowchart of a data processing method according to an exemplary embodiment.

FIG. 7 is a flowchart of another data processing method according to an exemplary embodiment. As shown in FIG. 7, the data processing method further includes the following operations:

S701: Determine a fifth time window according to second time and the fourth time window.

In the technical solution provided in the foregoing S701, after the updated incremental model is pushed online, a fifth time window may be determined according to second time and the fourth time window, where there is a third preset overlapping area between the fifth time window and the fourth time window.

After the updated incremental model is pushed online, incremental update training may be performed on the updated incremental model. First, a fifth time window is determined according to second time and the fourth time window, where there is a third preset overlapping area between the fifth time window and the fourth time window. Specifically, the second time may be determined as the right boundary of the fifth time window. That is, the right boundary of the fifth time window may conform with the second time. Specifically, the fourth time window may be slided to the second time, so that the right boundary of the slided fourth time window conforms with the second time, so as to obtain the right boundary of the fifth time window. Next, the right boundary of the fifth time window is pushed forward by a length of the fifth time window, so that the left boundary of the fifth time window can be obtained, and therefore the fifth time window can be determined according to the right boundary of the fifth time window and the left boundary of the fifth time window. It should be noted that the second time may be any time, and certainly, the second time may also be understood as current time corresponding to the incremental update training for the third time.

S702: Obtain third newly added data generated after an elapse of time corresponding to the fourth time window, and combine the third newly added data and the second to-be-processed data into fourth to-be-processed data.

In the technical solution provided in the foregoing S702, as time passes by, the third newly added data is generated after the time corresponding to the fourth time window, and is obtained, and then is combined with the second to-be-processed data into the fourth to-be-processed data, which may be used as a data object for subsequent processing.

S703: Perform iterative training on the updated incremental model for a fourth preset number of times by using fourth target data, located in the fifth time window, in the fourth to-be-processed data, to obtain a third incremental model of the neural network.

In the technical solution provided in the foregoing S703, iterative training is performed on the updated incremental model for a fourth preset number of times by using fourth target data in the fifth time window, to obtain a third incremental model of the neural network.

After the fifth time window is determined according to second time and the fourth time window, the fourth target data, located in the fifth time window, in the fourth to-be-processed data is determined, and iterative training is performed on the updated incremental model for a fourth preset number of times according to the fourth target data. The fourth target data may be advertisement click exposure data. That is, iteration may be performed on the updated incremental model for the fourth preset number of times by using the advertisement click exposure data. In an implementation, the fourth preset number of times may be less than or equal to the first preset number of times. In this way, the speed of updating an online model may be greatly accelerated, thereby more quickly reflecting the effect of user behavior changes and new data online.

S704: Publish the third incremental model online.

After the third incremental model of the neural network is obtained by performing iterative training on the updated incremental model for a fourth preset number of times by using fourth target data, located in the fifth time window, in the fourth to-be-processed data, the third incremental model is pushed online for pre-estimating a data click-through rate, so that the advertisement click-through rate can be pre-estimated.

The first to-be-processed data that stops being pushed exists in the third incremental model. That is, failure data exists in the third incremental model. In addition, as time passes by, the model constantly accumulates newly added data, so that the size of the model constantly expands. Therefore, to keep a suitable size of the model, failure data in the third incremental model also needs to be cleared. In an implementation, the method for clearing the failure data from the first incremental model is also applicable to a method for clearing the failure data from the third incremental model. That is, the foregoing method for clearing the failure data from the first incremental model may also be used as the method for clearing failure data from a model. Details are not described herein again.

According to this embodiment, a fifth time window is determined according to second time and the fourth time window after the updated incremental model is pushed online, where there is a third preset overlapping area between the fifth time window and the fourth time window; iterative training is performed on the updated incremental model for a fourth preset number of times by using fourth target data, located in the fifth time window, in the fourth to-be-processed data, to obtain a third incremental model of the neural network; and the third incremental model is published online, so that a data processing model is quickly updated.

As an optional embodiment, after the first incremental model of the neural network is obtained by performing the iterative training on the seed model for the second preset number of times by using the second to-be-processed data in the second time window, historical data may be fitted by using the first incremental model to obtain a fitting result, and the fitting result is carried by using the first incremental model. Next, the implementation manner will be described in detail with reference to FIG. 8.

Figure 8:
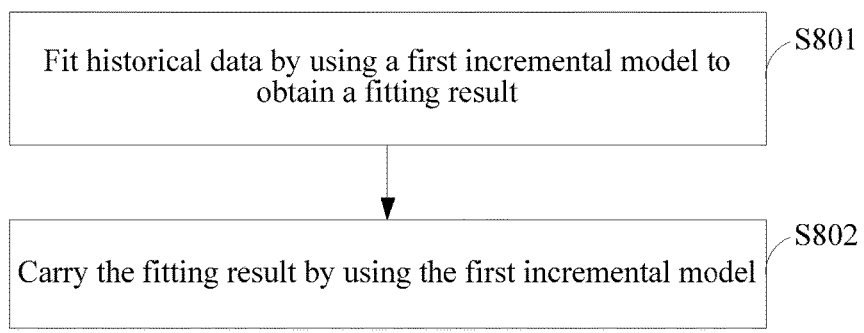
FIG. 8 is another flowchart of a data processing method according to an exemplary embodiment.

FIG. 8 is a flowchart of another data processing method according to an exemplary embodiment. As shown in FIG. 8, the data processing method further includes the following operations:

S801: Fit historical data by using the first incremental model to obtain a fitting result.

In the technical solution provided in the foregoing S801, after the first incremental model of the neural network is obtained by performing the iterative training on the seed model for the second preset number of times by using the second to-be-processed data in the second time window, historical data is fitted by using the first incremental model to obtain a fitting result, where the historical data may be processed to-be-processed data.

After the first incremental model of the neural network is obtained by performing the iterative training on the seed model for the second preset number of times by using the second to-be-processed data in the second time window, all historical data in the first incremental model is obtained. Then, the historical data is fitted by using the first incremental model to obtain a fitting result, thereby obtaining a fitting state for the historical data. For example, when the historical data is historical advertisement data, advertisement historical exposure data may be fitted by means of learning, so that a fitting result has the function of predicting an advertisement click-through rate in a future period of time.

S802: Carry the fitting result by using the first incremental model.

After the fitting result is obtained by fitting the historical data by using the first incremental model, the fitting result is carried by using the first incremental model. By means of model incremental training, the model permanently carries a fitting state for all historical data. Compared with a model on which full training is performed based on data, the cognition for user behaviors and data information by the model on which model incremental training is performed is more general. Therefore, fitting pre-estimation for a data click-through rate by the model on which model incremental training is performed is more accurate.

According to this embodiment, after the first incremental model of the neural network is obtained by performing the iterative training on the seed model for the second preset number of times by using the second to-be-processed data in the second time window, the historical data is fitted by using the first incremental model, to obtain the fitting result, where the historical data is processed to-be-processed data, and the fitting result is carried by using the first incremental model, so that model incremental training makes the model permanently carry a fitting state for all historical data, thereby improving the accuracy of fitting pre-estimation.

As an optional embodiment, the operation "performing iterative training on the neural network for a first preset number of times by using first target data, located in a first time window, in the first to-be-processed data" in S202 may include: in a cold start state, performing random initialization on parameters of layers of the neural network, to obtain an initialization parameter, where the cold start state is a state when the neural network is processed for a first time; and next, performing the iterative training on the neural network for the first preset number of times by using the first target data, located in the first time window, in the first to-be-processed data, and the initialization parameter, to obtain the seed model of the neural network. Next, the implementation manner will be described in detail with reference to FIG. 9.

Figure 9:
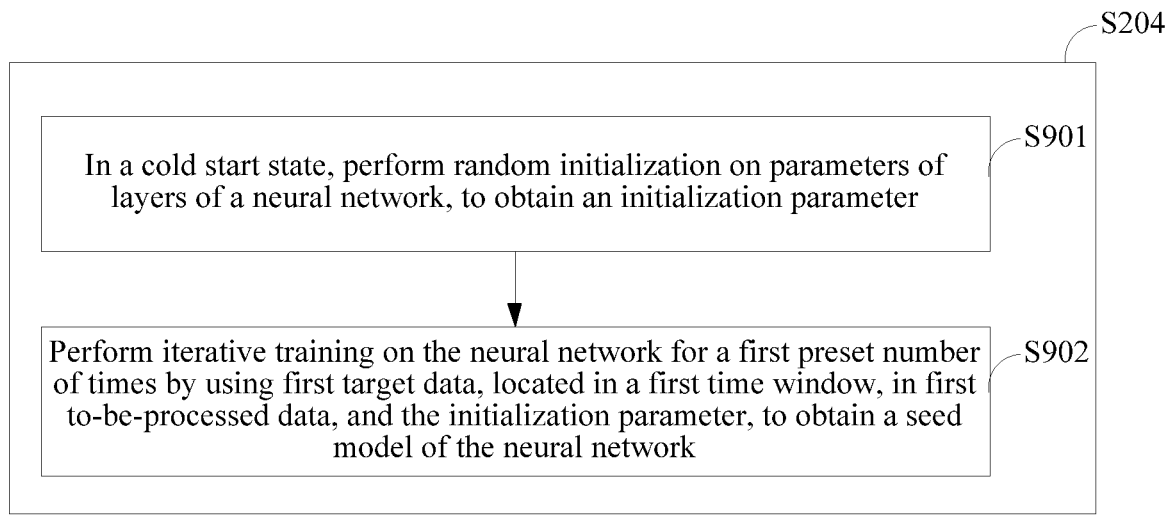
FIG. 9 is a flowchart of a method for performing iterative training on a neural network for a first preset number of times by using first target data, located in a first time window, in first to-be-processed data according to an exemplary embodiment.

FIG. 9 is a flowchart of a method for performing iterative training on a neural network for a first preset number of times by using first target data, located in a first time window, in first to-be-processed data according to an exemplary embodiment. As shown in FIG. 9, the method includes the following operations:

S901: In a cold start state, perform random initialization on parameters of layers of the neural network, to obtain an initialization parameter.

The cold start state is a state when the neural network is processed for a first time, and is a software start state, for example, a processed state after a fault recovery.

Because the neural network has a plurality of layers, to obtain the parameters of the layers of the neural network, random initialization needs to be performed on parameters of the layers. For example, initialization may be performed on the parameters of the layers of the neural network by using an even distribution random initialization method, a Gaussian distribution random initialization method, an Xavier initialization method, and the like, to obtain the initialization parameter.

S902: Perform the iterative training on the neural network for the first preset number of times by using the first target data, located in the first time window, in the first to-be-processed data, and the initialization parameter, to obtain the seed model of the neural network.

In the image classification field, when an image classification model is trained by using a deep convolutional neural network, when there is a relatively small amount of annotated training data, usually, after a standard 1000 classification model A is trained by using an ImageNet public data set, all convolutional layers are kept; a full connection layer is re-initialized and a classification target is set, and then a model meeting the classification requirement in its field is trained by using its own data.

During full model training once, a convergence model that sufficiently fits data needs to be obtained by performing multiple rounds of iteration by using sufficient training data based on a model on which random initialization is performed. The convergence model may be used to process data.

According to this embodiment, in a cold start state, random initialization is performed on parameters of layers of the neural network, to obtain an initialization parameter, the iterative training is performed on the neural network for the first preset number of times by using the first target data, located in the first time window, in the first to-be-processed data, and the initialization parameter, to obtain the seed model of the neural network, so as to perform iterative training on the neural network for first preset number of times by using the first target data, located in the first time window, in the first to-be-processed data, thereby providing basis for quickly updating a data processing model.

As an optional embodiment, the performing random initialization on parameters of layers of the neural network may include but is not limited to one of the following methods: separately performing initialization on the parameters of the layers of the neural network based on a particular constant; performing even distribution random initialization on the parameters of the layers of the neural network; performing Gaussian distribution random initialization on the parameters of the layers of the neural network; and performing Xavier initialization on the parameters of the layers of the neural network.

As an optional embodiment, the foregoing data processing method may be applied to a preset scenario. The preset scenario may include but not limited to one of the following: a CTR pre-estimation scenario of a media file; a training scenario of an image recognition model; a training scenario of a voice recognition model; and a training scenario of a natural language understanding model.

According to this embodiment, consideration is made from two aspects. On one hand, whether relay training may be performed from an old model to avoid learning from the beginning, and on the other hand, whether the capability of fitting historical data of the old model may be used to make the model keep the memory of all knowledge. If the model in data processing always keeps relay training, theoretically, any historical data is learnt by the model rather than having a fitting capability only for a specific data set, as in the case of cold start full training based on a specific data set. The functional attribute of this embodiment is to improve the accuracy of pre-estimating a data click-through rate, so as to improve the data click-through rate and income. The performance attribute is to improve the training efficiency of the model. The model pushing interval is reduced, and model quality is improved, so that user and data changes are quickly reflected.

It should be noted that in the incremental model update method of this embodiment, after the seed model is obtained, in each subsequent process of updating a model, a new incremental model is always obtained by performing iterative training based on the last model, and the new incremental model is pushed online. This cycle repeats, and failure data is periodically deleted from the model according to features of data to keep the scale and precision of the model. The incremental models include but are not limited to the first incremental model, the second incremental model, and the third incremental model.

Embodiment 2

The technical solution is described below with reference to an exemplary embodiment. In this embodiment, using an incremental update method of a deep neural network model as an example, a CTR pre-estimation scenario of a media file is described.

When incremental models increase by a number of hundreds, a deep neural network has a stronger expression capability, has a stronger capability of fitting nonlinear features of data, and has a stronger capability of processing a plurality of weights of the incremental models, so as to more accurately pre-estimate the CTR, thereby improving the capability of pre-estimating an advertisement click-through rate.

The deep neural network structure of this embodiment is a multilayer perceptron MLP. Its basic feature is that each nerve cell model in the network includes a differentiable nonlinear activation function; the deep neural network includes one or more layers hidden between the input and output neural nodes; and the deep neural network exhibits a high degree of connectivity, and the strength thereof is determined by the synaptic weight of the deep neural network. Optionally, a common algorithm for training the MLP is a back propagation (or referred to as "BP") algorithm.

When the media file is an advertisement, click-through rate pre-estimation is pre-estimating a probability of clicking, by a user, an advertisement. Therefore, pCTR=f(user, ad), wherein the pCTR is a probability of clicking, by a user, an advertisement (Click-Through Rate Prediction), user is a user feature, and ad is an advertisement feature. Advertisement click-through rate pre-estimation is prediction of the effect of advertisement exposure, and is an important indicator to evaluate the attractiveness of the advertisement to users, directly affecting the advertising income in a click-to-billing model. When there is a certain amount of advertisement exposure data, income=CTR*CPC, where CPC (Cost Per Click) represents the cost per click, is a common pricing form in the field of Internet advertising, and is a fee generated upon each time of click of the advertisement.

Factors that affect a click-through rate of a user for an advertisement are mainly derived from user features and advertisement features. Different users have a substantial difference in a click-through rate even if they click the same advertisement. Different advertising positions and presentation forms affect click behaviors of users. Different advertisement material contents also affect click behaviors of a same user. In feature-based advertisement click-through rate pre-estimation practice, a logistic regression model is a model used in the industry in a long term to predict a click-through rate model:

$$pCTR = P(\text{click} = 1 \mid X) = \frac{1}{1 + e^{-(\sum w_i * x_i + b)}}$$

$x_i$ is a vector for describing user features and advertisement features. $w_i$ is a vector corresponding to each feature of $x_i$, and represents a weight of each feature. Because $w_i$ can determine pCTR according to a value of the future, $w_i$ is also referred to as a model.

In data processing, in the model training process, learning may be performed by fitting mass advertisement exposure historical data by using a machine learning algorithm, to determine a suitable value of the vector $w_i$. Because the cost function of the logistic regression model is a convex function, training the logistic regression model is quick and simple, and the online prediction effect is good.

This embodiment may be applied to pre-estimating an advertisement click-through rate, and is a method for training an advertisement click-through rate pre-estimation model. The functional attribute is to improve the accuracy of pre-estimating an advertisement click-through rate, so as to improve the advertisement click-through rate and advertisement income. The performance attribute is to improve the training efficiency of the model. The model pushing interval is reduced, and model quality is improved, so that user and advertisement behavior changes are quickly reflected.

In an Internet advertisement scenario, click stream data is enormously generated, and a large amount of exposure data is generated each day. Because the advertisement exposure data includes context features such as advertisement content, user content, and time, the advertisement exposure data is valuable annotated data (whether the advertisement exposure data is click or not is used as annotation). The advertisement click-through rate pre-estimation model may fit advertisement historical exposure data by means of learning, and has the capability of predicting an advertisement click-through rate in a future period of time. On one hand, the advertisement click-through rate pre-estimation model needs to be quickly updated because user behaviors and advertisement materials are time-varying. On the other hand, the advertisement click-through rate pre-estimation model is required to learn unchanged attributes of a user advertisement click behavior mode by fitting mass historical data. Therefore, for update training of the advertisement click-through rate pre-estimation model, if a previous model is discarded and training is performed from the beginning each time, great waste will be caused. However, as can be learned according to transfer learning, the knowledge learned according to the model can be kept and transferred. Therefore, in this technical solution, an advertisement click-through rate pre-estimation model is trained by using an incremental update method. Training the advertisement click-through rate pre-estimation model by using the incremental update method is described below.

Figure 10:
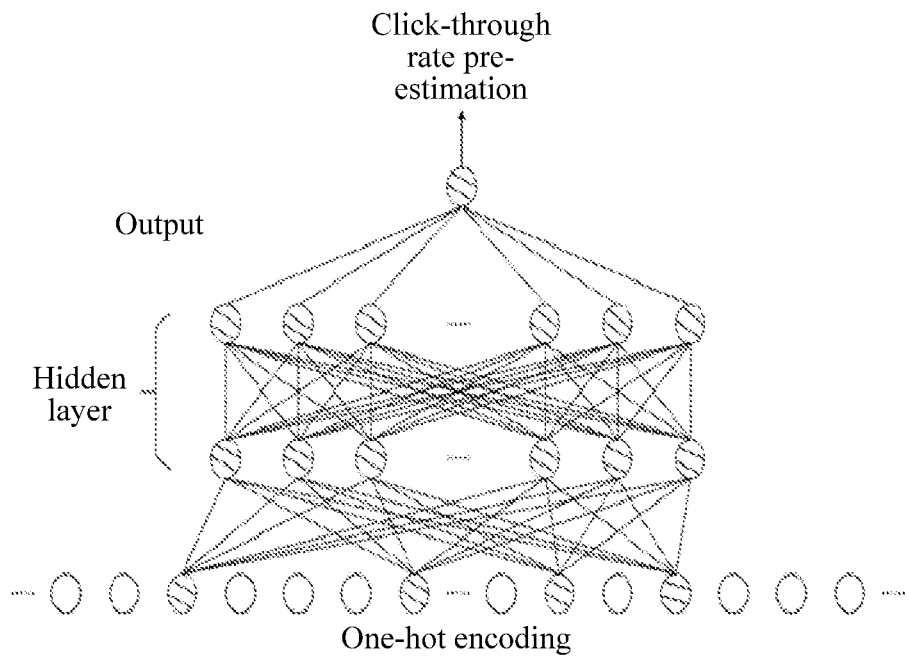
FIG. 10 is a schematic diagram of a full connection structure of a deep neural network according to an exemplary embodiment.

FIG. 10 is a schematic diagram of a full connection structure of a deep neural network according to an exemplary embodiment. As shown in FIG. 10, the deep neural network is a nerve cell connection of MLP neural networks of two hidden layers, and is more complex than a common neural network. A one-hot encoding vector obtained by performing discretization on a combination of user features and advertisement features in each advertisement exposure log in training data is input into the deep neural network, and click-through rate pre-estimation is output from the deep neural network. The deep neural network includes nerve cells that need to be involved in a back propagation calculation in deep neural network training due to non-zero elements in an input vector, such as nerve cells represented by slashes in FIG. 10. The deep neural network is applicable to a deep neutral network (or referred to as "DNN") of an advertisement CTR pre-estimation scenario.

Figure 11:
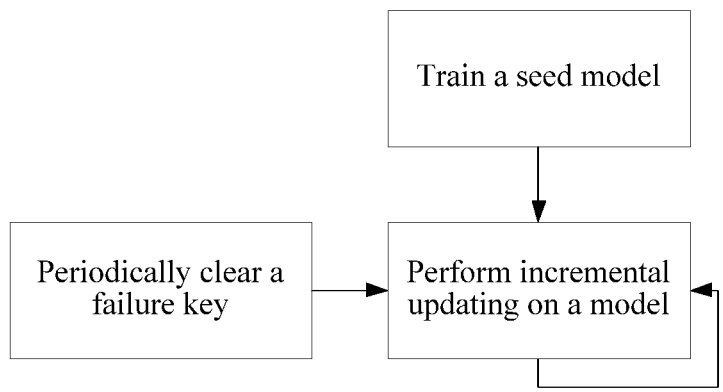
FIG. 11 is another flowchart of a data processing method according to an exemplary embodiment.

FIG. 11 is a flowchart of another data processing method according to an exemplary embodiment. As shown in FIG. 11, the data processing method includes the following operations:

Operation 1: Train a Seed Model.

In a cold start state, a random initialization method is used for parameters of layers of a model M by using the initialization model M. Retrogressive from current time, a data window T0 is determined, and then a data time span in the data window T0 is (current time–T0, current time). The model is trained for I iterations by using advertisement click exposure data in the data window T0, to obtain a seed model M0. The seed model is not pushed online for the moment.

In an implementation, according to operations described for training the seed model in this embodiment, random initialization methods for the initialization model may be an even distribution random initialization method, a Gaussian distribution random initialization method, an Xavier initialization method, and the like.

Operation 2: Perform Incremental Updating on a Model.

Incremental update training for the first time: the data window T0 is slided based on the seed model M0, so that a right boundary of the data window T0 conforms with current time, to obtain a slided data window T1; the model is trained for i iterations by using advertisement click exposure data in the slided data window T1, where i<<I.

A model M1 is obtained by means of training, and is pushed online for pre-estimating an advertisement click-through rate, until a new model is pushed next time.

Incremental Update Training for the Second Time:

Incremental update training for the second time: the data window T1 is slided based on the previous model M1, so that a right boundary of the data window T1 conforms with current time, to obtain a slided data window T2; the model is trained for i iterations by using advertisement click exposure data in the slided data window T2, where i<<I.

A model M2 is obtained by means of training, and is pushed online for pre-estimating an advertisement click-through rate, until a new model is pushed next time.

By such analogy, incremental update training for the nth time is as follows: a data window Tn−1 is slided based on a previous model Mn−1, so that a right boundary of the data window Tn−1 conforms with current time, to obtain a slided data window Tn; the model is trained for i iterations by using advertisement click exposure data in the slided data window Tn, where i<<I.

A model Mn is obtained by means of training, and is pushed online for pre-estimating an advertisement click-through rate, until a new model is pushed next time.

In the phase of incremental update training on a model, a model learning operation should be suitably reduced, the learning operation should be less than or equal to a learning operation used in the last iteration of the training phase of the seed model, to prevent trained weights from leaving optimal points.

It should be noted that in the operations described for incremental update training on the model in this embodiment, the used learning iteration number is adjustable, and a different learning iteration number should not be used as a new idea.

Operation 3: Periodically Clear a Failure Key.

Because after the seed model is trained, a new model is trained by using an incremental update operation each time, as time passes by, models constantly accumulate, to make the size of the models constantly expand. However, the characteristic of an Internet advertisement scenario is: each advertisement has a life cycle t, beyond the preset release time, the advertisement is discontinued and release of the advertisement is stopped. Therefore, it is meaningless to subsequently pre-estimate this type of advertisement stopping being released.

An operation for periodically clearing a failure key from a model is set, so as to maintain a suitable size of the model, and keep learning the advertisement in release.

Figure 12:
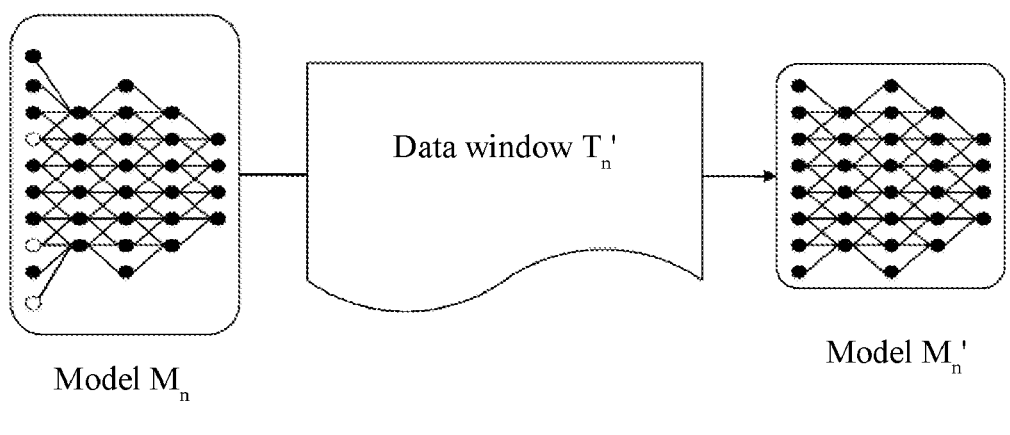
FIG. 12 is a schematic diagram of periodically clearing a failure key according to an exemplary embodiment.

FIG. 12 is a schematic diagram of periodically clearing a failure key according to an exemplary embodiment. As shown in FIG. 12, for a model Mn on which incremental updating is performed, the data window Tn is extended by x times in time to obtain Tn' as a barrier, and features (nerve cell representatives), not in the data window, of the model Mn are cleared. That is, the input layer nerve cells and connection relationships represented by invalid keys are cleared to obtain a model Mn', and in the next (n+1th) incremental update training, Mn' is used instead of Mn as the reference model.

This technical solution is not only applicable to an advertisement CTR pre-estimation scenario, but also applicable and transferable in scenarios such as image recognition training, voice recognition model training, and natural language understanding model.

It should be noted that for the foregoing method embodiments, for ease of description, the method embodiments are all described into a series of action combinations. However, a person skilled in the art should know that this application is not limited by a sequence of described actions because according to this application, some operations may be performed in other sequences or may be simultaneously performed. Secondly, a person skilled in the art should also know that the embodiments described in this specification are merely exemplary embodiments, and actions and modules involved in this description are not necessarily required in the embodiments.

By means of the description of the foregoing implementation, a person skilled in the art can clearly learn that the method according to the foregoing embodiment may be implemented by means of software plus necessary general-purpose hardware platforms, and certainly, may alternatively be implemented by hardware. However, in many cases, the former is a better implementation. Based on such an understanding, the technical solutions essentially, or the part contributing to the existing technology may be implemented in a form of a software product. The computer software product is stored in a storage medium (such as a read-only memory (ROM)/random access memory (RAM), a magnetic disk, or an optical disc) and includes several instructions for instructing a terminal device (which may be a mobile phone, a computer, a server, a network device, or the like) to perform the methods described in the embodiments.

Embodiment 3

Figure 13:
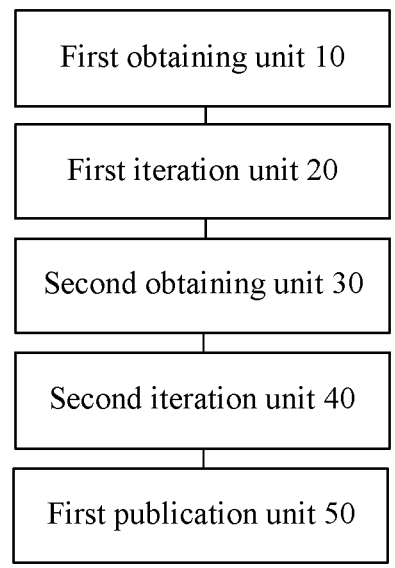
FIG. 13 is a schematic diagram of a data processing apparatus according to an exemplary embodiment.

According to an exemplary embodiment, a data processing apparatus configured to implement the foregoing data processing method is further provided. FIG. 13 is a schematic diagram of a data processing apparatus according to an exemplary embodiment. As shown in FIG. 13, the data processing apparatus may include: a first obtaining unit 10, a first iteration unit 20, a second obtaining unit 30, a second iteration unit 40, and a first publication unit 50.

The first obtaining unit 10 is configured to obtain first to-be-processed data input into a neural network, the neural network being a to-be-updated model.

The first iteration unit 20 is configured to perform iterative training on the neural network for a first preset number of times by using first target data in the first to-be-processed data, to obtain a seed model of the neural network, the first target data being located in a first time window, and the seed model being an initialization model of the neural network.

The second obtaining unit 30 is configured to obtain first newly added data generated after an elapse of time corresponding to the first time window, and combine the first newly added data and the first to-be-processed data into second to-be-processed data.

The second iteration unit 40 is configured to perform iterative training on the seed model for a second preset number of times by using second target data in the second to-be-processed data, to obtain a first incremental model of the neural network, the second target data being located in a second time window, and there being a first preset overlapping area between the second time window and the first time window; and a first publication unit, configured to publish the first incremental model online. In an implementation, a right boundary of the second time window conforms with current time, and the second preset number of times is less than or equal to the first preset number of times.

The first publication unit 50 is configured to publish the first incremental model online.

Figure 14:
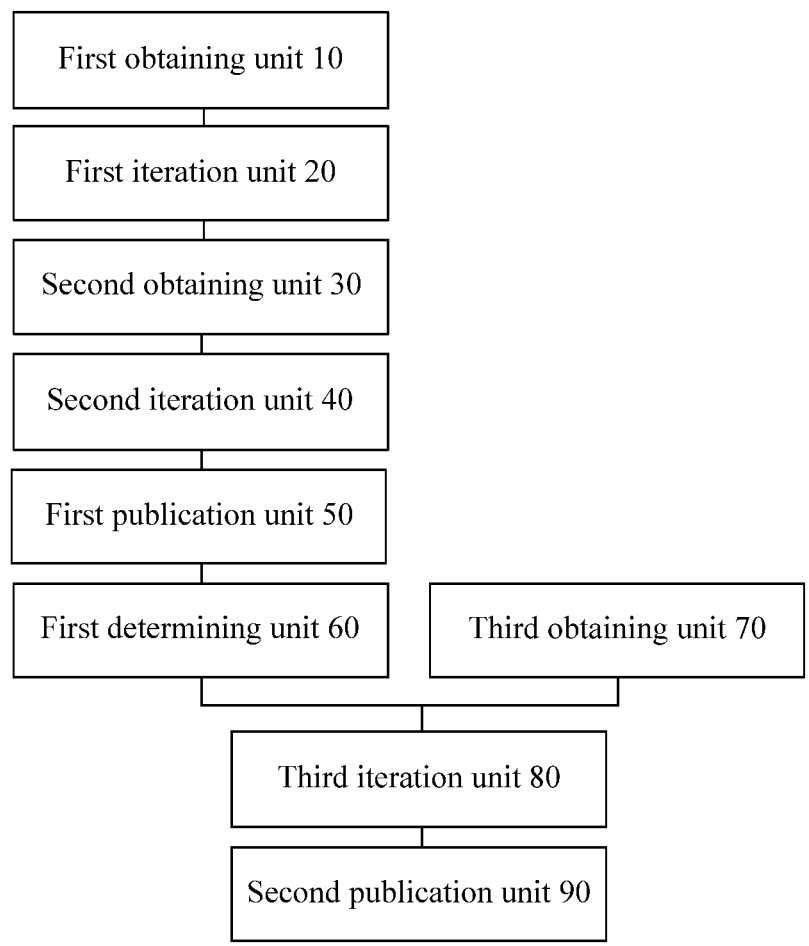
FIG. 14 is another schematic diagram of another data processing apparatus according to an exemplary embodiment.

FIG. 14 is a schematic diagram of another data processing apparatus according to an exemplary embodiment. As shown in FIG. 14, the data processing apparatus may include: a first obtaining unit 10, a first iteration unit 20, a second obtaining unit 30, a second iteration unit 40, and a first publication unit 50. The data processing apparatus further includes: a first determining unit 60, a third obtaining unit 70, a third iteration unit 80, and a second publication unit 90.

It should be noted that the functions of the first obtaining unit 10, the first iteration unit 20, the second obtaining unit 30, the second iteration unit 40, and the first publication unit 50 of this embodiment are the same or similar to those in the data processing apparatus of the embodiment shown in FIG. 13. Details are not described herein again.

The first determining unit 60 is configured to determine a third time window according to first time and the second time window after the first incremental model is published online, where there is a second preset overlapping area between the third time window and the second time window. In an implementation, a right boundary of the third time window conforms with the first time.

The third obtaining unit 70 is configured to obtain second newly added data generated after an elapse of time corresponding to the second time window, and combine the second newly added data and the second to-be-processed data into third to-be-processed data.

The third iteration unit 80 is configured to perform iterative training on the first incremental model for a third preset number of times by using third target data in the third to-be-processed data, to obtain a second incremental model of the neural network, where the third target data is located in the third time window. In an implementation, the third preset number of times is less than or equal to the first preset number of times.

The second publication unit 90 is configured to publish the second incremental model online.

Figure 15:
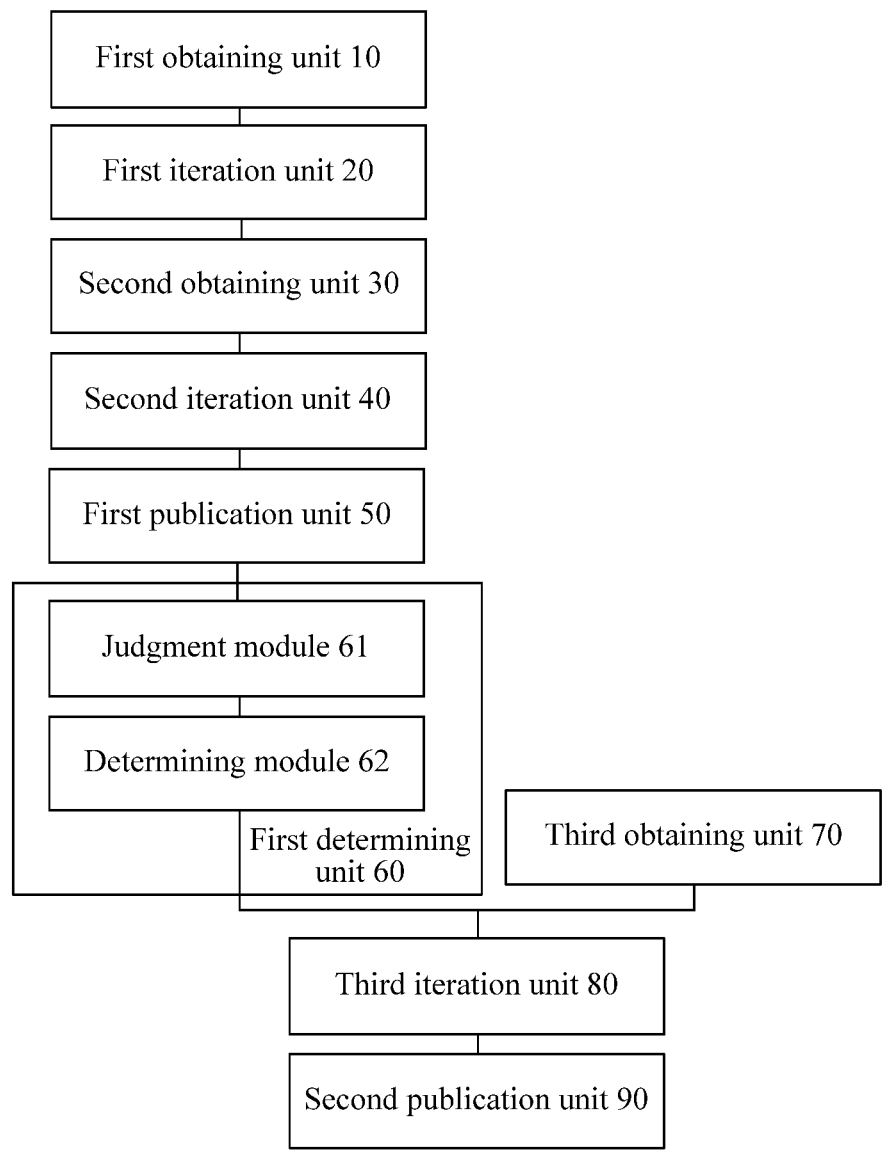
FIG. 15 is another schematic diagram of another data processing apparatus according to an exemplary embodiment.

FIG. 15 is a schematic diagram of another data processing apparatus according to an exemplary embodiment. As shown in FIG. 15, the data processing apparatus may include: a first obtaining unit 10, a first iteration unit 20, a second obtaining unit 30, a second iteration unit 40, a first publication unit 50, a first determining unit 60, a third obtaining unit 70, a third iteration unit 80, and a second publication unit 90. The first determining unit 60 includes: a judgment module 61 and a determining module 62.

It should be noted that the functions of the first obtaining unit 10, the first iteration unit 20, the second obtaining unit 30, the second iteration unit 40, the first publication unit 50, the determining unit 60, the third obtaining unit 70, the third iteration unit 80, and the second publication unit 90 of this embodiment are the same or similar to those in the data processing apparatus of the embodiment shown in FIG. 14. Details are not described herein again.

The judgment module 61 is configured to determine whether there is indication information for pushing a new model, where the new model includes the second incremental model.

The determining module 62 is configured to determine the first time as a right boundary of the third time window when it is determined that there is the indication information, slide the second time window to the right boundary of the third time window, and push the right boundary of the third time window forward by a length of the third time window, to obtain a left boundary of the third time window, and determine the third time window according to the right boundary of the third time window and the left boundary of the third time window.

Figure 16:
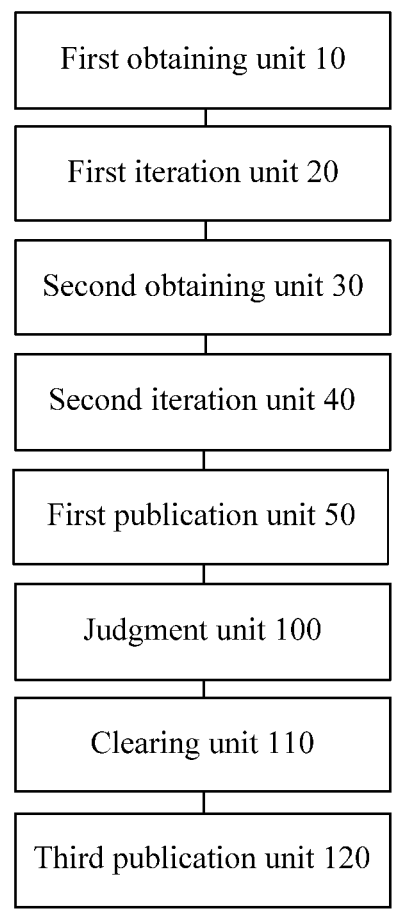
FIG. 16 is another schematic diagram of another data processing apparatus according to an exemplary embodiment.

FIG. 16 is a schematic diagram of another data processing apparatus according to an exemplary embodiment. As shown in FIG. 16, the data processing apparatus may include: a first obtaining unit 10, a first iteration unit 20, a second obtaining unit 30, a second iteration unit 40, and a first publication unit 50. The data processing apparatus further includes: a judgment unit 100, a clearing unit 110, and a third publication unit 120.

It should be noted that the functions of the first obtaining unit 10, the first iteration unit 20, the second obtaining unit 30, the second iteration unit 40, and the first publication unit 50 of this embodiment are the same or similar to those in the data processing apparatus of the embodiment shown in FIG. 13. Details are not described herein again.

The judgment unit 100 is configured to determine, according to a preset period, whether failure data exists in the first incremental model after the first incremental model is published online, where the failure data is the first to-be-processed data stopped to be pushed.

The clearing unit 110 is configured to clear the failure data from the first incremental model to obtain an updated incremental model if it is determined according to the preset period that the failure data exists in the first incremental model.

The third publication unit 120 is configured to publish the updated incremental model online.

Figure 17:
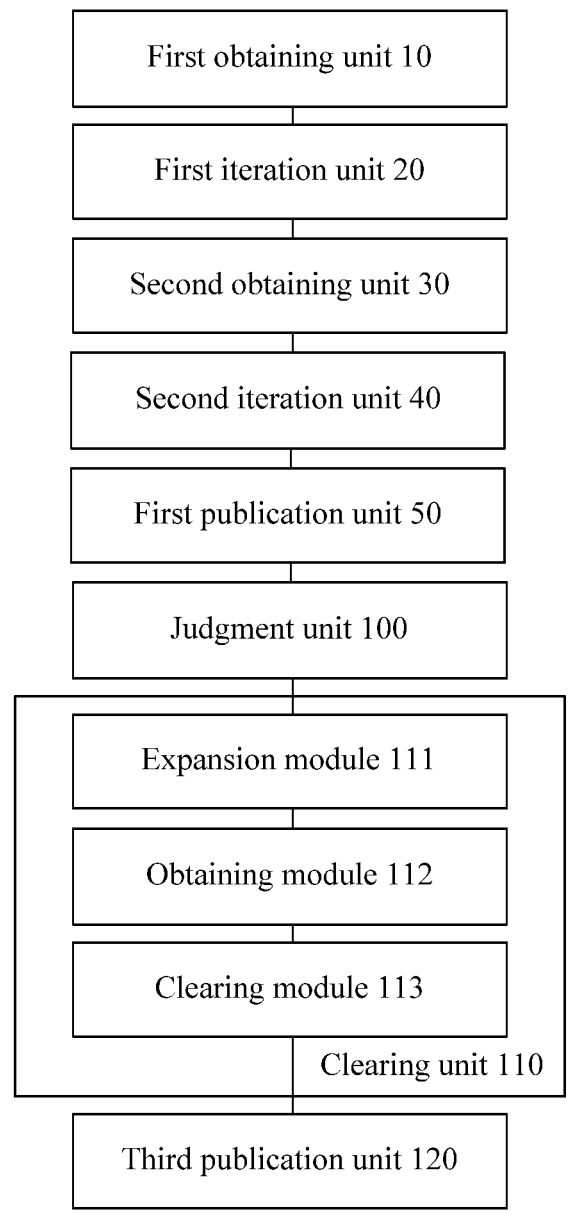
FIG. 17 is another schematic diagram of another data processing apparatus according to an exemplary embodiment.

FIG. 17 is a schematic diagram of another data processing apparatus according to an exemplary embodiment. As shown in FIG. 17, the data processing apparatus may include: a first obtaining unit 10, a first iteration unit 20, a second obtaining unit 30, a second iteration unit 40, a first publication unit 50, a judgment unit 100, a clearing unit 110, and a third publication unit 120. The clearing unit 110 includes: an expansion module 111, an obtaining module 112, and a clearing module 113.

It should be noted that the functions of the first obtaining unit 10, the first iteration unit 20, the second iteration unit 40, the first publication unit 50, the judgment unit 100, the clearing unit 110, and the third publication unit 120 of this embodiment are the same or similar to those in the data processing apparatus of the embodiment shown in FIG. 16. Details are not described herein again.

The expansion module 111 is configured to expand the second time window by a preset multiple, to obtain a fourth time window.

The obtaining module 112 is configured to obtain the second to-be-processed data in the first incremental model, and use the second to-be-processed data as the failure data, where the second to-be-processed data is not in the fourth time window.

The clearing module 113 is configured to clear the failure data from the first incremental model to obtain the updated incremental model.

In an implementation, the data processing apparatus further includes: a second determining unit, a fourth obtaining unit, a fourth iteration unit, and a fourth publication unit.

The second determining unit is configured to determine a fifth time window according to second time and the fourth time window after the updated incremental model is pushed online, where there is a third preset overlapping area between the fifth time window and the fourth time window.

The fourth obtaining unit is configured to obtain third newly added data generated after an elapse of time corresponding to the fourth time window, and combine the third newly added data and the second to-be-processed data into fourth to-be-processed data.

The fourth iteration unit is configured to perform iterative training on the updated incremental model for a fourth preset number of times by using fourth target data in the fourth to-be-processed data, to obtain a third incremental model of the neural network, where the fourth target data is located in the fifth time window. In an embodiment, the fourth preset number of times is less than or equal to the first preset number of times, and a right boundary of the fifth time window conforms with the second time.

The fourth publication unit is configured to publish the third incremental model online.

In an implementation, the data processing apparatus further includes: a fitting unit and a carrying unit. The fitting unit is configured to: after the first incremental model of the neural network is obtained by performing the iterative training on the seed model for the second preset number of times by using the second to-be-processed data in the second time window, fit historical data by using the first incremental model to obtain a fitting result, where the historical data is processed to-be-processed data.

The carrying unit is configured to carry the fitting result by using the first incremental model.

In an implementation, the data processing apparatus further includes: a first iteration unit 20, including a processing module and an iteration module. The processing module is configured to perform random initialization on parameters of layers of the neural network in a cold start state, to obtain an initialization parameter, where the cold start state is a state when the neural network is processed for a first time.

The iteration module is configured to perform the iterative training on the neural network for the first preset number of times by using the first target data, located in the first time window, in the first to-be-processed data, and the initialization parameter, to obtain the seed model of the neural network.

In an implementation, that the processing module is configured to perform random initialization on parameters of layers of the neural network includes but is not limited to one of the following methods: separately performing initialization on the parameters of the layers of the neural network based on a particular constant; performing even distribution random initialization on the parameters of the layers of the neural network; performing Gaussian distribution random initialization on the parameters of the layers of the neural network; and performing Xavier initialization on the parameters of the layers of the neural network.

In an implementation, the preset scenario includes but is not limited to one of the following: a CTR pre-estimation scenario of a media file; a training scenario of an image recognition model; a training scenario of a voice recognition model; and a training scenario of a natural language understanding model.

It should be noted that the first obtaining unit 10 in this embodiment may be configured to perform S201 in Embodiment 1; the first iteration unit 20 in this embodiment may be configured to perform S202 in Embodiment 1; the second obtaining unit 30 in this embodiment may be configured to perform S203 of Embodiment 1; the second iteration unit 40 in this embodiment may be configured to perform S204 in Embodiment 1; and the first publication unit 50 in this embodiment may be configured to perform S205 in Embodiment 1.

It should be noted herein that examples and application scenarios implemented by the foregoing units and modules and corresponding operations may be the same, but are not limited to the content disclosed in Embodiment 1. It should be noted that the foregoing modules, as a part of the apparatus, may run in the hardware environment shown in FIG. 1, may be implemented by software, hardware, and/or a combination of software and hardware. The hardware environment includes a network environment.

According to this embodiment, a first obtaining unit 10 is configured to obtain first to-be-processed data input into a neural network, the neural network being a to-be-updated model; a first iteration unit 20 is configured to perform iterative training on the neural network for a first preset number of times by using first target data, located in a first time window, in the first to-be-processed data, to obtain a seed model of the neural network, the seed model being an initialization model of the neural network; a second obtaining unit 30 is configured to obtain first newly added data generated after an elapse of time corresponding to the first time window, and combine the first newly added data and the first to-be-processed data into second to-be-processed data; a second iteration unit 40 is configured to perform iterative training on the seed model for a second preset number of times by using second target data, located in a second time window, in the second to-be-processed data, to obtain a first incremental model of the neural network, there being a first preset overlapping area between the second time window and the first time window; and a first publication unit 50 is configured to publish the first incremental model online, so as to solve the technical problem that a data processing model cannot be quickly updated, thereby quickly updating the data processing model.

Embodiment 4

According to an exemplary embodiment, a server or a terminal configured to implement the foregoing data processing method is further provided.

Figure 18:
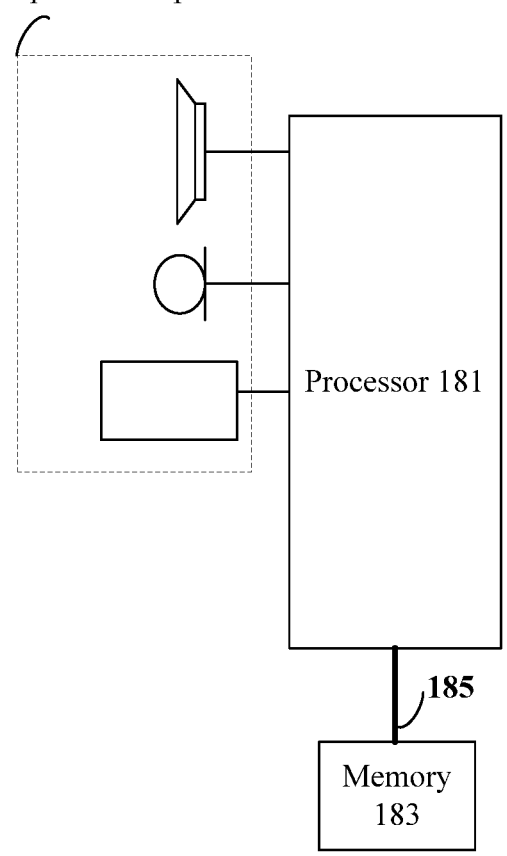
FIG. 18 is a structural block diagram of a terminal according to an exemplary embodiment.

FIG. 18 is a structural block diagram of a terminal according to an exemplary embodiment. As shown in FIG. 18, the terminal may include: one or more (although only one is shown in the figure for brevity of explanation) processors 181, a memory 183, and a transmission apparatus 185. As shown in FIG. 18, the terminal may further include an input and output device 187.

The memory 183 may be configured to store a software program and module, for example, a program instruction/module corresponding to the data processing method and apparatus in an exemplary embodiment. The processor 181 runs the software program and module stored in the memory 183, to implement various functional applications and data processing, that is, implement the foregoing data processing method. The memory 183 may include a high-speed random access memory, and may also include a nonvolatile memory, for example, one or more magnetic storage apparatuses, flash memories or other nonvolatile solid-state memories. In some embodiments, the memory 183 may further include memories remotely disposed relative to the processor 181, and these remote memories may be connected to the terminal through a network. Examples of the network include, but are not limited to, the Internet, an intranet, a local area network, a mobile communications network, and a combination thereof.

The transmission apparatus 185 is configured to receive or send data by using a network, and may also be configured to perform data transmission between the processor and the memory. Specific examples of the network may include a wired network and a wireless network. In an example, the transmission apparatus 185 includes a network interface controller (NIC), which may be connected to another network device and a router through a network cable, to communicate with the Internet or a local area network. In an example, the transmission apparatus 185 is a radio frequency (RF) module, which is configured to communicate with the Internet in a wireless manner.

Specifically, the memory 183 is configured to store an application program.

The processor 181 may invoke, by using the transmission apparatus 185, an application program stored in the memory 183, to perform the following operations:

obtaining first to-be-processed data input into a neural network, the neural network being a to-be-updated model;

performing iterative training on the neural network for a first preset number of times by using first target data in the first to-be-processed data, to obtain a seed model of the neural network, the first target data being located in a first time window, and the seed model being an initialization model of the neural network;

obtaining first newly added data generated after an elapse of time corresponding to the first time window, and combining the first newly added data and the first to-be-processed data into second to-be-processed data;

performing iterative training on the seed model for a second preset number of times by using second target data in the second to-be-processed data, to obtain a first incremental model of the neural network, the second target data being located in a second time window, and there being a first preset overlapping area between the second time window and the first time window; and publishing the first incremental model online.

The processor 181 is further configured to perform the following operations: determining a third time window according to first time and the second time window after publishing the first incremental model online, where there is a second preset overlapping area between the third time window and the second time window; obtaining second newly added data generated after an elapse of time corresponding to the second time window, and combining the second newly added data and the second to-be-processed data into third to-be-processed data; performing iterative training on the first incremental model for a third preset number of times by using third target data in the third to-be-processed data, to obtain a second incremental model of the neural network, where the third target data is located in the third time window; and publishing the second incremental model online.

The processor 181 is further configured to perform the following operations: determining whether there is indication information for pushing a new model, where the new model includes the second incremental model; determining the first time as a right boundary of the third time window if determining that there is the indication information; sliding the second time window to the right boundary of the third time window, and pushing the right boundary of the third time window forward by a length of the third time window, to obtain a left boundary of the third time window; and determining the third time window according to the right boundary of the third time window and the left boundary of the third time window.

The processor 181 is further configured to perform the following operations: determining, according to a preset period, whether failure data exists in the first incremental model after publishing the first incremental model online, where the failure data is the first to-be-processed data stopped to be pushed; clearing the failure data from the first incremental model to obtain an updated incremental model if determining according to the preset period that the failure data exists in the first incremental model; and publishing the updated incremental model online.

The processor 181 is further configured to perform the following operations: expanding the second time window by a preset multiple, to obtain a fourth time window; obtaining the second to-be-processed data in the first incremental model, using the second to-be-processed data as the failure data, where the second to-be-processed data is not in the fourth time window, and clearing the failure data from the first incremental model to obtain the updated incremental model.

The processor 181 is further configured to perform the following operations: determining a fifth time window according to second time and the fourth time window after pushing the updated incremental model online, where there is a third preset overlapping area between the fifth time window and the fourth time window; obtaining third newly added data generated after an elapse of time corresponding to the fourth time window, and combining the third newly added data and the second to-be-processed data into fourth to-be-processed data; performing iterative training on the updated incremental model for a fourth preset number of times by using fourth target data in the fourth to-be-processed data, to obtain a third incremental model of the neural network, where the fourth target data is located in the fifth time window; and publishing the third incremental model online.

The processor 181 is further configured to perform the following operations: after obtaining the first incremental model of the neural network by performing the iterative training on the seed model for the second preset number of times by using the second to-be-processed data in the second time window, fitting historical data by using the first incremental model to obtain a fitting result, where the historical data is processed to-be-processed data; and carrying the fitting result by using the first incremental model.

The processor 181 is further configured to perform the following operations: in a cold start state, performing random initialization on parameters of layers of the neural network, to obtain an initialization parameter, where the cold start state is a state when the neural network is processed for a first time; and performing the iterative training on the neural network for the first preset number of times by using the first target data and the initialization parameter, to obtain the seed model of the neural network.

By using this embodiment, a data processing solution is provided. First to-be-processed data input into a neural network is obtained, the neural network being a to-be-updated model, iterative training is performed on the neural network for a first preset number of times by using first target data, located in a first time window, in the first to-be-processed data, to obtain a seed model of the neural network, the seed model being an initialization model of the neural network, first newly added data generated after an elapse of time corresponding to the first time window is obtained, and the first newly added data is combined with the first to-be-processed data into second to-be-processed data; iterative training is performed on the seed model for a second preset number of times by using second target data, located in a second time window, in the second to-be-processed data, to obtain a first incremental model of the neural network, there being a first preset overlapping area between the second time window and the first time window, and the first incremental model is published online, so as to update and publish the incremental model, thereby quickly updating the data processing model, and therefore the problem that the data processing model cannot be quickly updated is solved.

In an implementation, reference may be made to examples described in the foregoing embodiments for specific examples in this embodiment, and details are not described herein again.

A person of ordinary skill in the art may understand that, the structure shown in FIG. 18 is only exemplary. The terminal may be a terminal device such as a smartphone (such as an Android mobile phone or an iOS mobile phone), a tablet computer, a palmtop computer, a mobile Internet device (MID), or a PAD. FIG. 18 does not limit the structure of the foregoing electronic apparatus. For example, the terminal may further include more or fewer components (such as a network interface and a display apparatus) than those shown in FIG. 18, or has a configuration different from that shown in FIG. 18.

A person of ordinary skill in the art may understand that all or some of the operations in the methods of the foregoing embodiments may be implemented by a program instructing relevant hardware of the terminal device. The program may be stored in a computer-readable storage medium. The storage medium may be a flash disk, a ROM, a RAM, a magnetic disk, an optical disc, or the like.

Embodiment 5

An exemplary embodiment further provides a storage medium. In an implementation, in this embodiment, the foregoing storage medium may be used to execute a program code for performing a data processing method.

In an implementation, the storage medium may be located on at least one network device of a plurality of network devices in the network shown in the foregoing embodiment.

In an implementation, the storage medium is configured to store program codes for performing the following operations:

obtaining first to-be-processed data input into a neural network, first target data being located in a first time window, and the neural network being a to-be-updated model;

performing iterative training on the neural network for a first preset number of times by using the first target data in the first to-be-processed data, to obtain a seed model of the neural network, the seed model being an initialization model of the neural network;

obtaining first newly added data generated after an elapse of time corresponding to the first time window, and combining the first newly added data and the first to-be-processed data into second to-be-processed data;

performing iterative training on the seed model for a second preset number of times by using second target data in the second to-be-processed data, to obtain a first incremental model of the neural network, the second target data being located in a second time window, and there being a first preset overlapping area between the second time window and the first time window; and publishing the first incremental model online.

In an implementation, the storage medium is further configured to store program codes for performing the following operations: determining a third time window according to first time and the second time window after the first incremental model is published online, where there is a second preset overlapping area between the third time window and the second time window; obtaining second newly added data generated after an elapse of time corresponding to the second time window, and combining the second newly added data and the second to-be-processed data into third to-be-processed data; performing iterative training on the first incremental model for a third preset number of times by using third target data in the third to-be-processed data, to obtain a second incremental model of the neural network, where the third target data is located in the third time window; and publishing the second incremental model online.

In an implementation, the storage medium is further configured to store program codes for performing the following operations: determining whether there is indication information for pushing a new model, where the new model includes the second incremental model; determining the first time as a right boundary of the third time window if determining that there is the indication information; sliding the second time window to the right boundary of the third time window, and pushing the right boundary of the third time window forward by a length of the third time window, to obtain a left boundary of the third time window; and determining the third time window according to the right boundary of the third time window and the left boundary of the third time window.

In an implementation, the storage medium is further configured to store program codes for performing the following operations: determining, according to a preset period, whether failure data exists in the first incremental model after the first incremental model is published online, where the failure data is the first to-be-processed data stopped to be pushed; clearing the failure data from the first incremental model to obtain an updated incremental model if determining according to the preset period that the failure data exists in the first incremental model; and publishing the updated incremental model online.

In an implementation, the storage medium is further configured to store program codes for performing the following operations: expanding the second time window by a preset multiple, to obtain a fourth time window; obtaining the second to-be-processed data in the first incremental model, using the second to-be-processed data as the failure data, where the second to-be-processed data is not in the fourth time window, and clearing the failure data from the first incremental model to obtain the updated incremental model.

In an implementation, the storage medium is further configured to store program codes for performing the following operations: determining a fifth time window according to second time and the fourth time window after the updated incremental model is pushed online, where there is a third preset overlapping area between the fifth time window and the fourth time window; obtaining third newly added data generated after an elapse of time corresponding to the fourth time window, and combining the third newly added data and the second to-be-processed data into fourth to-be-processed data; performing iterative training on the updated incremental model for a fourth preset number of times by using fourth target data in the fourth to-be-processed data, to obtain a third incremental model of the neural network, where the fourth target data is located in the fifth time window; and publishing the third incremental model online.

In an implementation, the storage medium is further configured to store program codes for performing the following operations: after the first incremental model of the neural network is obtained by performing the iterative training on the seed model for the second preset number of times by using the second to-be-processed data in the second time window, fitting historical data by using the first incremental model to obtain a fitting result, where the historical data is data obtained by processing previous to-be-processed data; and carrying the fitting result by using the first incremental model.

In an implementation, the storage medium is further configured to store program codes for performing the following operations: in a cold start state, performing random initialization on parameters of layers of the neural network, to obtain an initialization parameter, where the cold start state is a state when the neural network is processed for a first time; and performing the iterative training on the neural network for the first preset number of times by using the first target data and the initialization parameter, to obtain the seed model of the neural network.

In an implementation, reference may be made to examples described in the foregoing embodiments for specific examples in this embodiment, and details are not described herein again.

In an implementation, in this embodiment, the storage medium may include but is not limited to: various media that can store program codes such as a USB flash drive, a ROM, a RAM, a removable hard disk, a magnetic disk, or an optical disc.

Embodiment 6

An exemplary embodiment further provides a computer program product including an instruction, the computer program product, when running on a computer, causing the computer to perform any implementation in the data processing method according to the foregoing embodiments.

The sequence numbers of the foregoing embodiments are merely for the convenience of description, and do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the operations of the methods described in the embodiments.

In the foregoing embodiments, descriptions of the embodiments have different emphases, and as for parts that are not described in detail in one embodiment, reference can be made to the relevant description of the other embodiments.

In the several embodiments provided in this application, it should be understood that the disclosed client may be implemented in other manners. The described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The "unit" or "module" used herein may be a hardware component such as a processor or a circuit, and/or a software component that is executed by a hardware component such as a processor.

In addition, functional units in the embodiments may be integrated into one processing unit, or each of the units may exist alone physically, or two or more units are integrated into one unit. The integrated unit may be implemented in the form of hardware, or may be implemented in the form of a software functional unit.

The foregoing descriptions are merely exemplary implementations, and it should be noted that a person of ordinary skill in the art may further make several improvements and modifications without departing from the principle of the disclosure. These improvements and modifications should also be considered as the protection scope of the disclosure.

What is claimed is:

1. A data processing method in a data processing device, comprising:
   obtaining, by at least one processor of the data processing device, first to-be-processed data input into a neural network, the neural network being a to-be-updated model;
   performing, by the at least one processor of the data processing device, iterative training on the neural network for a first preset number of times by using first target data in the first to-be-processed data, to obtain a seed model of the neural network, the first target data being located in a first time window, and the seed model being an initialization model of the neural network;
   obtaining, by the at least one processor of the data processing device, first newly added data generated after an elapse of time corresponding to the first time window, and combining the first newly added data and the first to-be-processed data into second to-be-processed data;
   performing, by the at least one processor of the data processing device, iterative training on the seed model for a second preset number of times by using second target data in the second to-be-processed data, to obtain a first incremental model of the neural network, the second target data being located in a second time window, and a first preset area overlapping between the second time window and the first time window;
   publishing, by the at least one processor of the data processing device, the first incremental model online;
   determining, by the at least one processor of the data processing device, a third time window according to first time and the second time window, a second preset area overlapping between the third time window and the second time window;
   obtaining, by the at least one processor of the data processing device, second newly added data generated after an elapse of time corresponding to the second time window, and combining the second newly added data and the second to-be-processed data into third to-be-processed data;
   performing, by the at least one processor of the data processing device, iterative training on the first incremental model for a third preset number of times by using third target data in the third to-be-processed data, to obtain a second incremental model of the neural network, wherein the third target data is located in the third time window; and
   publishing, by the at least one processor of the data processing device, the second incremental model online,
   wherein the determining the third time window comprises:
   determining whether there is indication information for pushing a new model, wherein the new model comprises the second incremental model;
   determining the first time as a right boundary of the third time window based on a result of determination that there is the indication information;
   sliding the second time window to the right boundary of the third time window, and pushing the right boundary of the third time window forward by a length of the third time window, to obtain a left boundary of the third time window; and
   determining the third time window according to the right boundary of the third time window and the left boundary of the third time window.

2. The method according to claim 1, wherein a right boundary of the second time window conforms with current time.

3. The method according to claim 1, wherein the right boundary of the third time window conforms with the first time.

4. The method according to claim 1, further comprising:
   determining, by the at least one processor of the data processing device, according to a preset period, whether failure data exists in the first incremental model, wherein the failure data is the first to-be-processed data stopped to be pushed;
   clearing, by the at least one processor of the data processing device, the failure data from the first incremental model to obtain an updated incremental model based on a result of determination, according to the preset period, that the failure data exists in the first incremental model; and
   publishing, by the at least one processor of the data processing device, the updated incremental model online.

5. The method according to claim 4, wherein the clearing comprises:
   expanding the second time window by a preset multiple, to obtain a fourth time window; and
   obtaining the second to-be-processed data in the first incremental model, using the second to-be-processed data as the failure data, wherein the second to-be-processed data is not in the fourth time window, and clearing the failure data from the first incremental model to obtain the updated incremental model.

6. The method according to claim 5, further comprising:
determining, by the at least one processor of the data processing device, a fifth time window according to second time and the fourth time window, a third preset area overlapping between the fifth time window and the fourth time window;
obtaining, by the at least one processor of the data processing device, third newly added data generated after an elapse of time corresponding to the fourth time window, and combining the third newly added data and the second to-be-processed data into fourth to-be-processed data;
performing, by the at least one processor of the data processing device, iterative training on the updated incremental model for a fourth preset number of times by using fourth target data in the fourth to-be-processed data, to obtain a third incremental model of the neural network, wherein the fourth target data is located in the fifth time window; and
publishing, by the at least one processor of the data processing device, the third incremental model online.

7. The method according to claim 6, wherein a right boundary of the fifth time window conforms with the second time.

8. The method according to claim 1, further comprising:
fitting historical data by using the first incremental model to obtain a fitting result, wherein the historical data is data obtained by processing previous to-be-processed data; and
carrying the fitting result by using the first incremental model.

9. The method according to claim 1, wherein the performing the iterative training on the neural network comprises:
in a cold start state, performing random initialization on parameters of layers of the neural network, to obtain an initialization parameter, wherein the cold start state is a state when the neural network is processed for a first time; and
performing the iterative training on the neural network for the first preset number of times by using the first target data and the initialization parameter, to obtain the seed model of the neural network.

10. The method according to claim 9, wherein the performing the random initialization comprises at least one of:
separately performing initialization on the parameters of the layers of the neural network based on a particular constant;
performing even distribution random initialization on the parameters of the layers of the neural network;
performing Gaussian distribution random initialization on the parameters of the layers of the neural network; or
performing Xavier initialization on the parameters of the layers of the neural network.

11. The method according to claim 1, wherein the method is applied to a preset scenario, and the preset scenario comprises at least one of:
a click-through rate (CTR) pre-estimation scenario of a media file;
a training scenario of an image recognition model;
a training scenario of a voice recognition model; or
a training scenario of a natural language understanding model.

12. The method according to claim 1, wherein the second preset number of times is less than or equal to the first preset number of times.

13. A The method according to claim 1, wherein the third preset number of times is less than or equal to the first preset number of times.

14. The method according to claim 6, wherein the fourth preset number of times is less than or equal to the first preset number of times.

15. A data processing apparatus, comprising:
at least one memory configured to store program code; and
at least one processor configured to access the at least one memory and operate according to the program code, the program code comprising:
code configured to cause the at least one processor to obtain first to-be-processed data input into a neural network, the neural network being a to-be-updated model;
code configured to cause the at least one processor to perform iterative training on the neural network for a first preset number of times by using first target data in the first to-be-processed data, to obtain a seed model of the neural network, the first target data being located in a first time window, and the seed model being an initialization model of the neural network;
code configured to cause the at least one processor to obtain first newly added data generated after an elapse of time corresponding to the first time window, and combine the first newly added data and the first to-be-processed data into second to-be-processed data;
code configured to cause the at least one processor to perform iterative training on the seed model for a second preset number of times by using second target data in the second to-be-processed data, to obtain a first incremental model of the neural network, the second target data being located in a second time window, a first preset area overlapping between the second time window and the first time window;
code configured to cause the at least one processor to publish the first incremental model online;
code configured to cause the at least one processor to determine a third time window according to first time and the second time window, a second preset area overlapping between the third time window and the second time window;
code configured to cause the at least one processor to obtain second newly added data generated after an elapse of time corresponding to the second time window, and combine the second newly added data and the second to-be-processed data into third to-be-processed data;
code configured to cause the at least one processor to perform iterative training on the first incremental model for a third preset number of times by using third target data in the third to-be-processed data, to obtain a second incremental model of the neural network, wherein the third target data is located in the third time window; and
code configured to cause the at least one processor to publish the second incremental model online,
wherein the code configured to cause the at least one processor to determine the third time window is further configured to cause the at least one processor to:
determine whether there is indication information for pushing a new model, wherein the new model comprises the second incremental model;
determine the first time as a right boundary of the third time window based on a result of determination that there is the indication information;

slide the second time window to the right boundary of the third time window, and push the right boundary of the third time window forward by a length of the third time window, to obtain a left boundary of the third time window; and determine the third time window according to the right boundary of the third time window and the left boundary of the third time window.

16. The apparatus according to claim 15, wherein the right boundary of the second time window conforms with current time.

17. A non-transitory computer-readable storage medium, storing program code, which, when executed by one or more processors, causes the one or more processors to perform:
obtaining first to-be-processed data input into a neural network, the neural network being a to-be-updated model;
performing iterative training on the neural network for a first preset number of times by using first target data in the first to-be-processed data, to obtain a seed model of the neural network, the first target data being located in a first time window, and the seed model being an initialization model of the neural network;
obtaining first newly added data generated after an elapse of time corresponding to the first time window, and combining the first newly added data and the first to-be-processed data into second to-be-processed data;
performing iterative training on the seed model for a second preset number of times by using second target data in the second to-be-processed data, to obtain a first incremental model of the neural network, the second target data being located in a second time window, a first preset area overlapping between the second time window and the first time window;
publishing the first incremental model online;
determining a third time window according to first time and the second time window, a second preset area overlapping between the third time window and the second time window;
obtaining second newly added data generated after an elapse of time corresponding to the second time window, and combining the second newly added data and the second to-be-processed data into third to-be-processed data;
performing iterative training on the first incremental model for a third preset number of times by using third target data in the third to-be-processed data, to obtain a second incremental model of the neural network, wherein the third target data is located in the third time window; and
publishing the second incremental model online,
wherein the determining the third time window comprises:
determining whether there is indication information for pushing a new model, wherein the new model comprises the second incremental model;
determining the first time as a right boundary of the third time window based on a result of determination that there is the indication information;
sliding the second time window to the right boundary of the third time window, and pushing the right boundary of the third time window forward by a length of the third time window, to obtain a left boundary of the third time window; and
determining the third time window according to the right boundary of the third time window and the left boundary of the third time window.

* * * * *